P. P. PUPILLA.
CANDY COATING MACHINE.
APPLICATION FILED FEB. 7, 1914. RENEWED APR. 4, 1918.

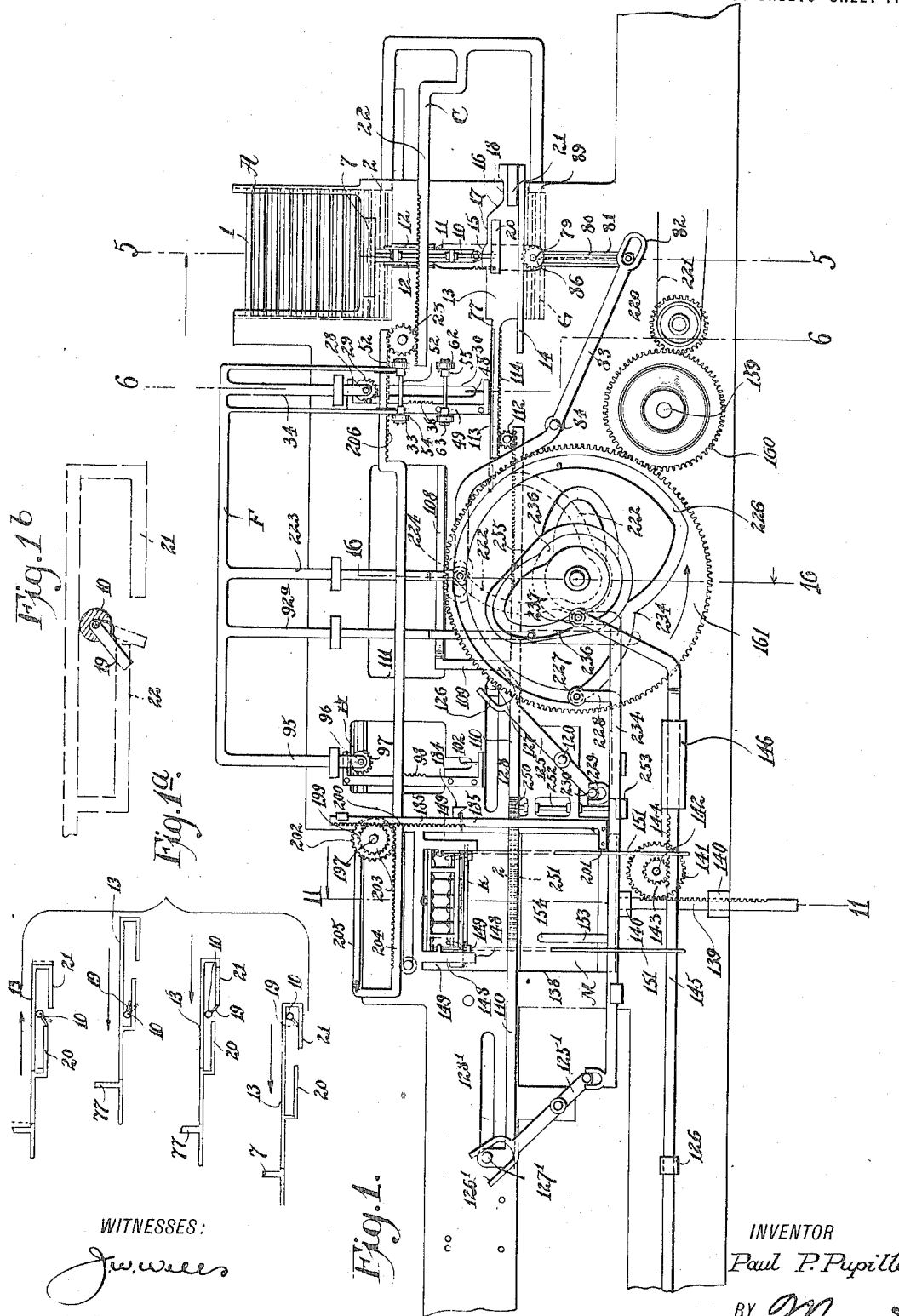

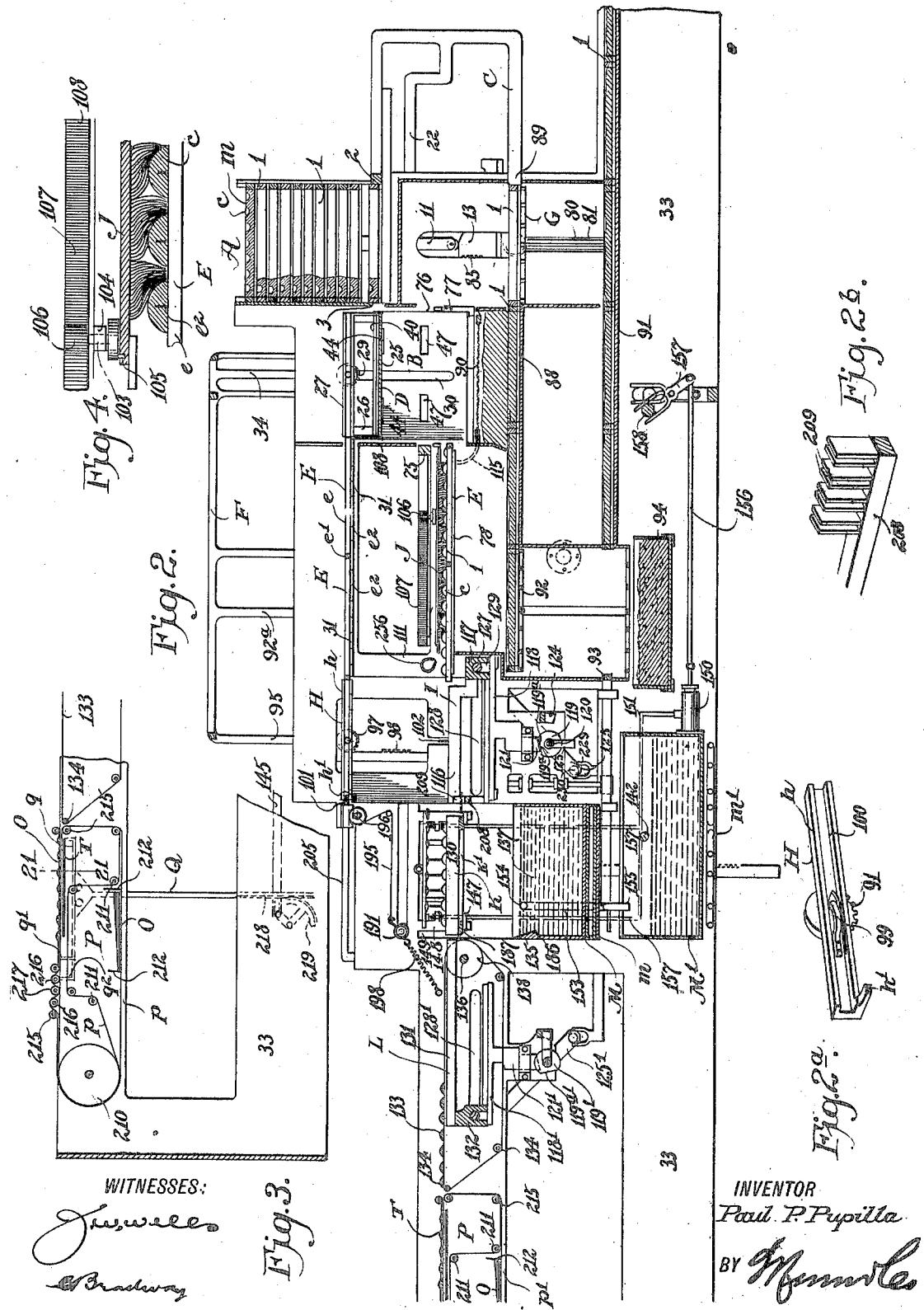

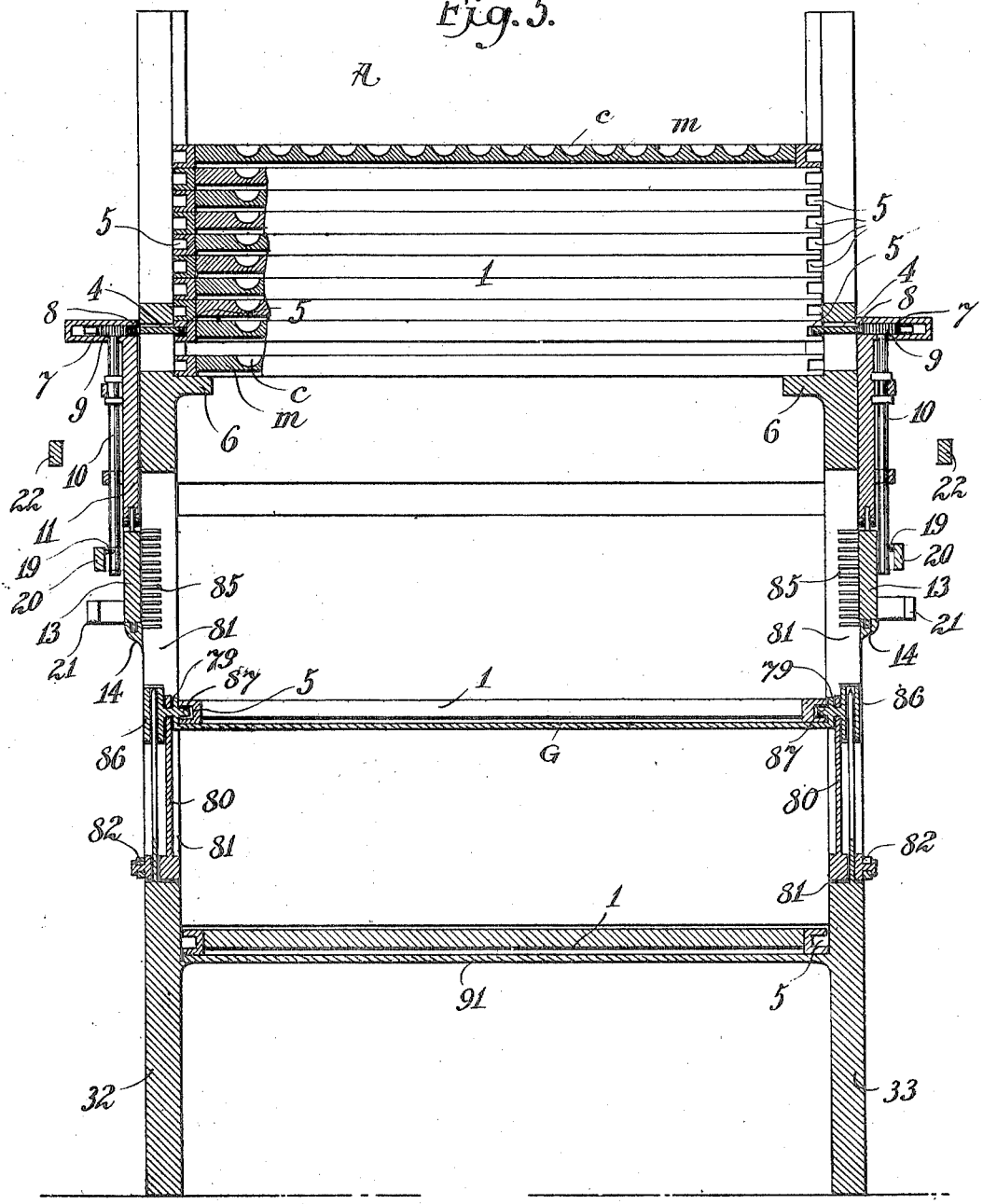

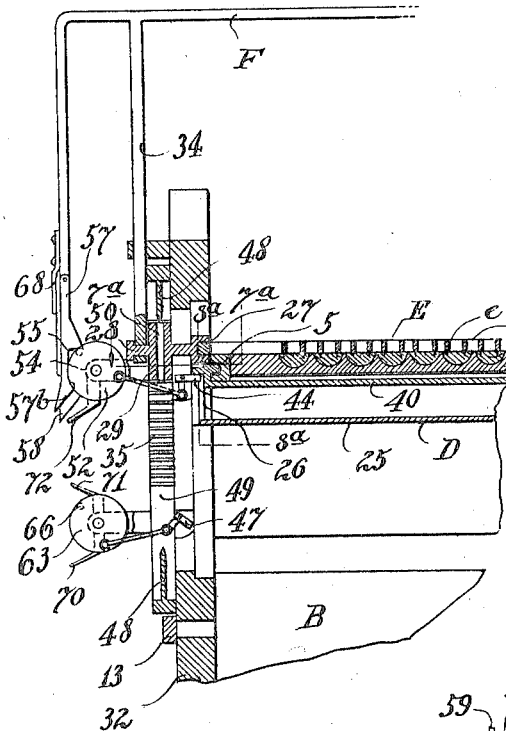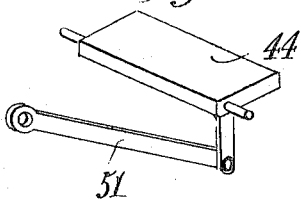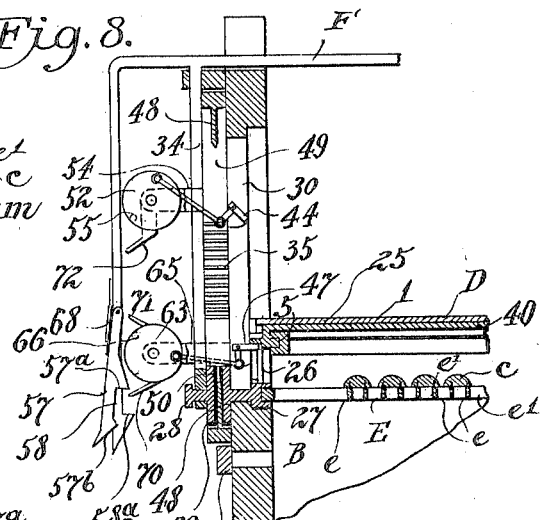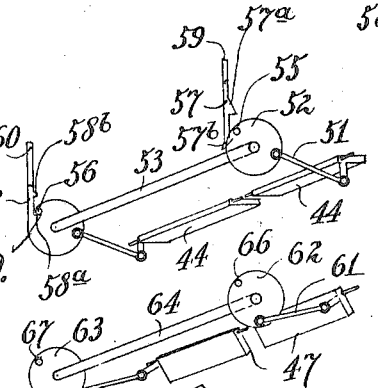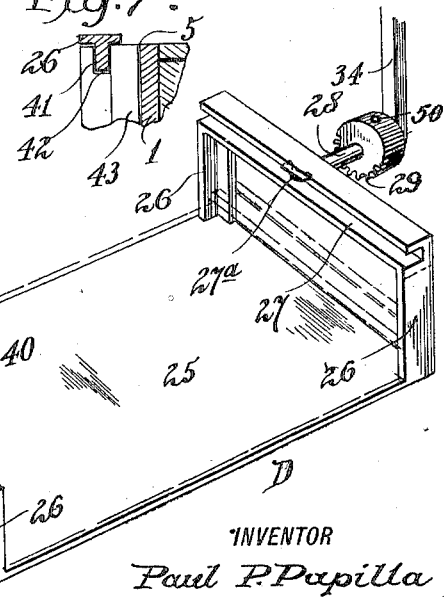

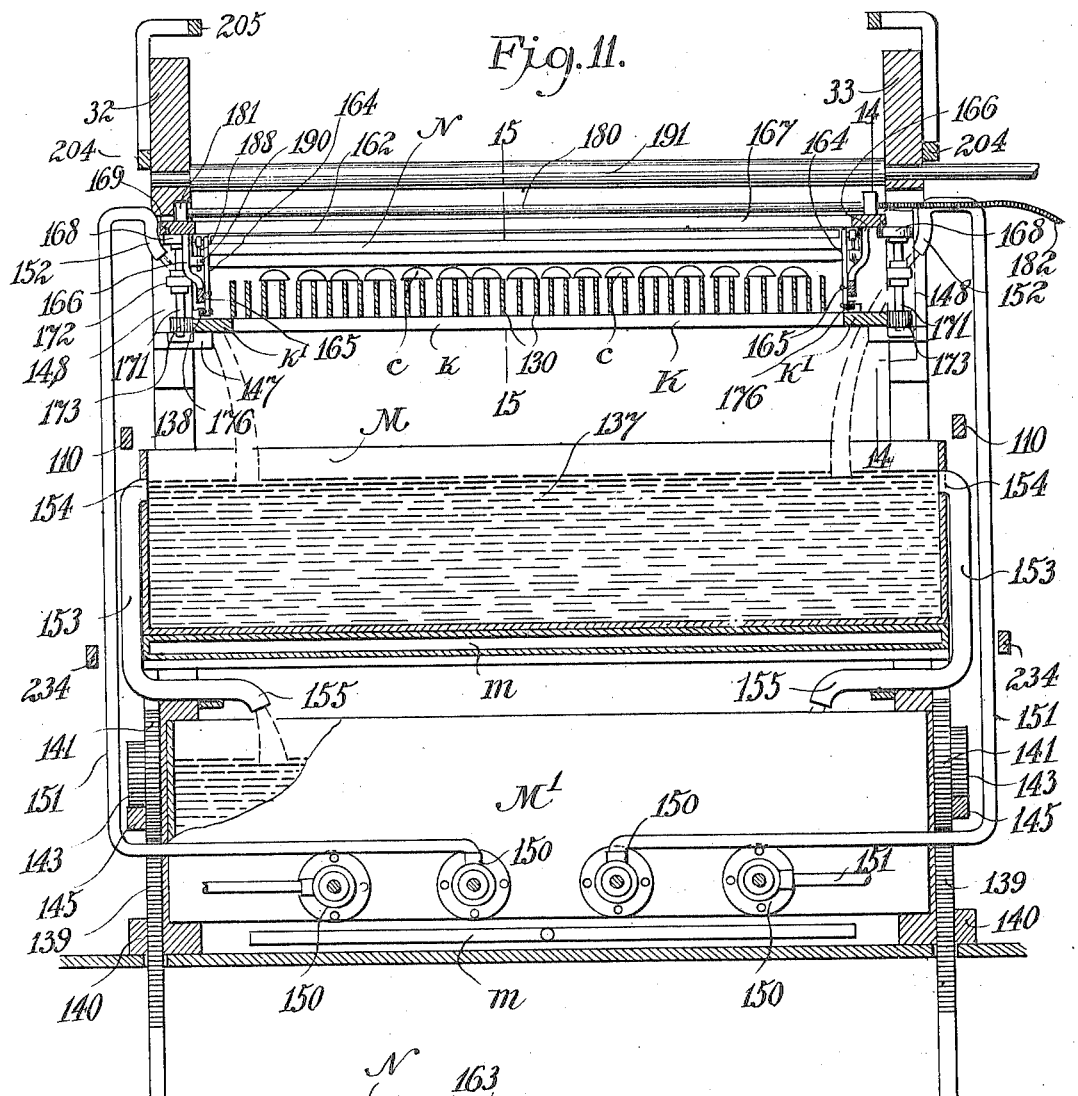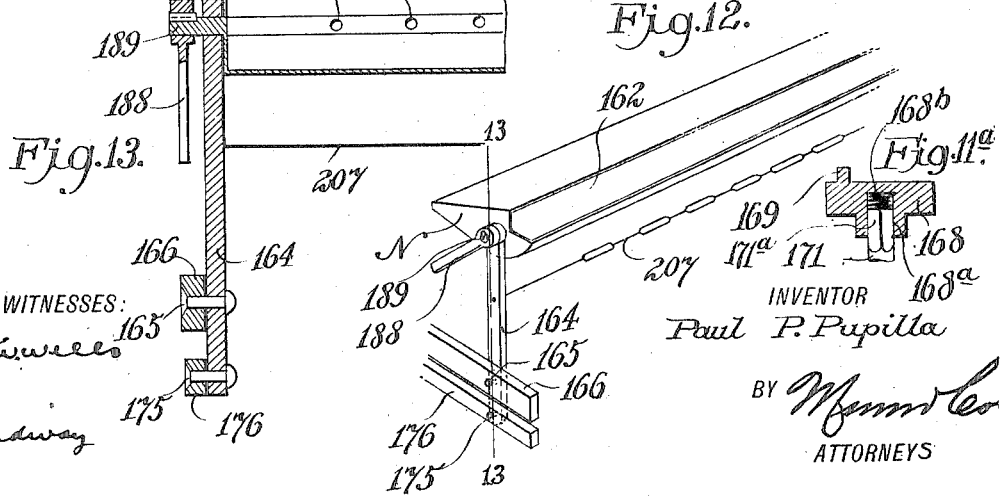

1,294,946.

Patented Feb. 18, 1919.
11 SHEETS—SHEET 7.

WITNESSES:

INVENTOR
Paul P. Papilla
BY
ATTORNEYS

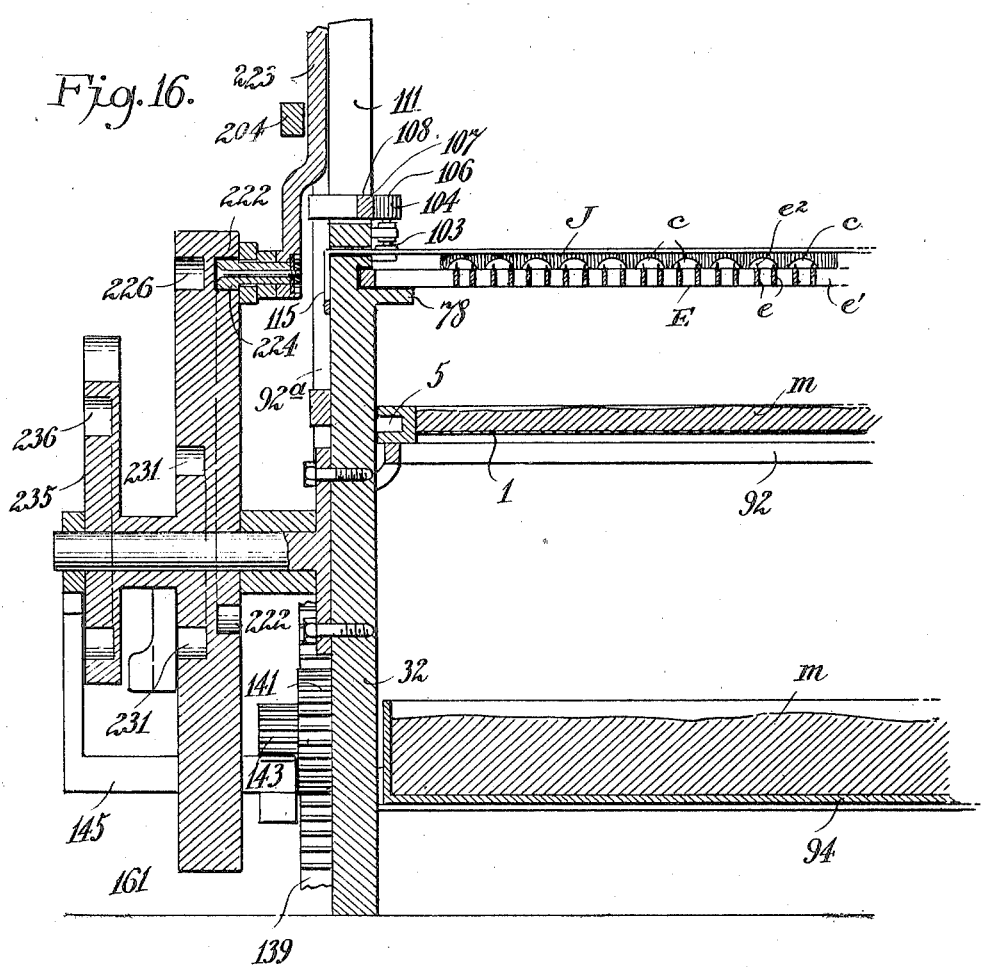
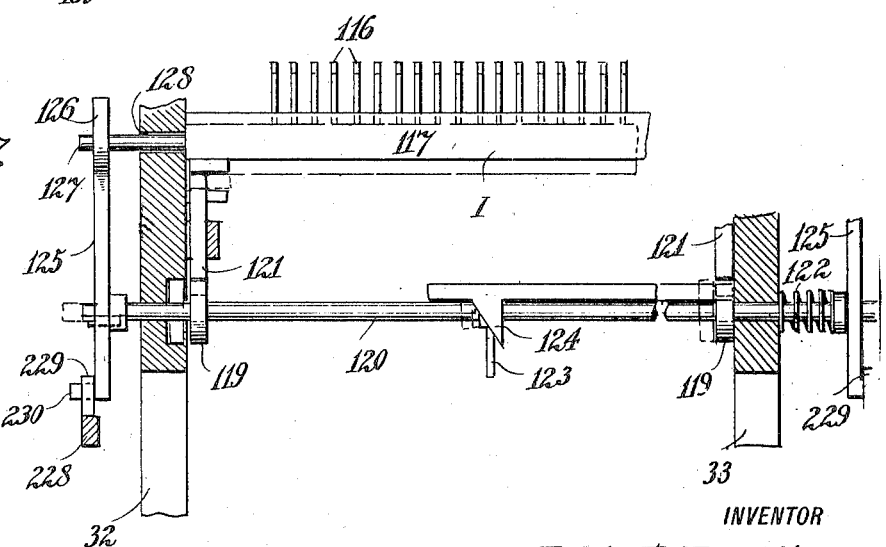

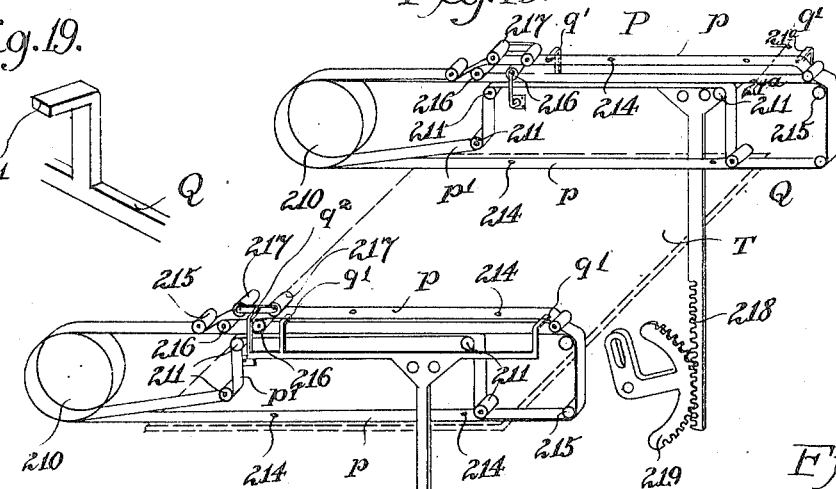

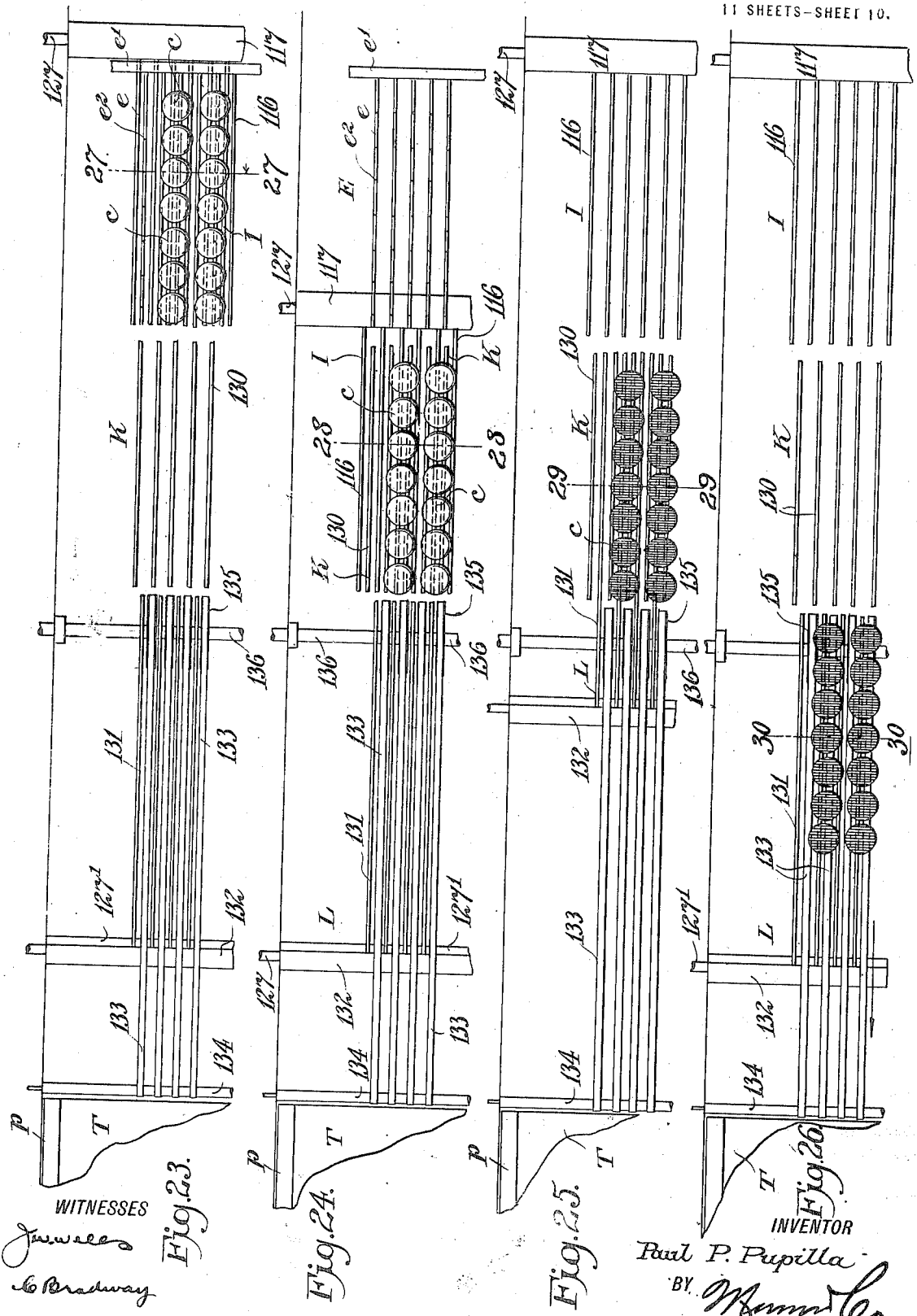

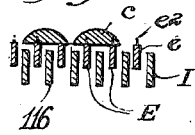
Fig. 27.
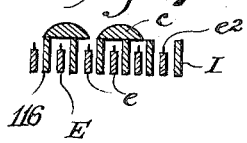
Fig. 27.ª
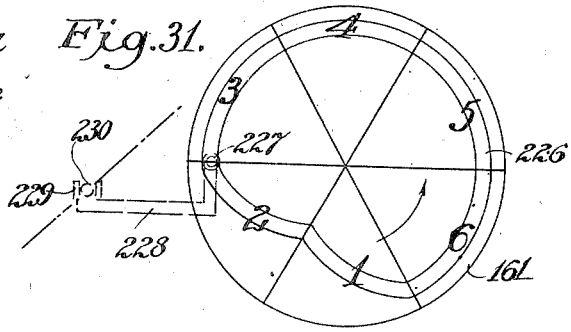
Fig. 31.
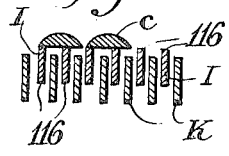
Fig. 28.
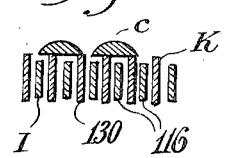
Fig. 28.ª
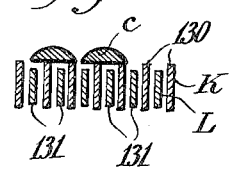
Fig. 29.
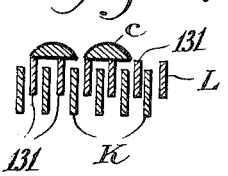
Fig. 29.ª
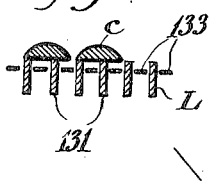
Fig. 30.
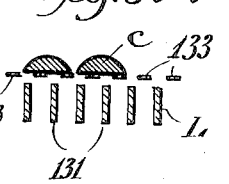
Fig. 30.ª
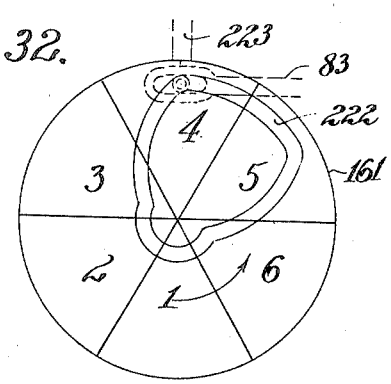
Fig. 32.
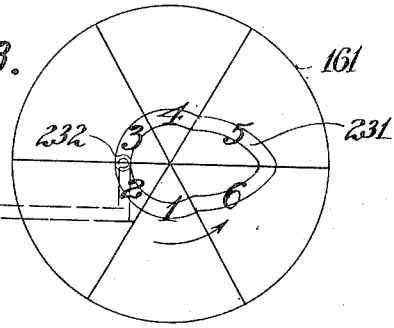
Fig. 33.
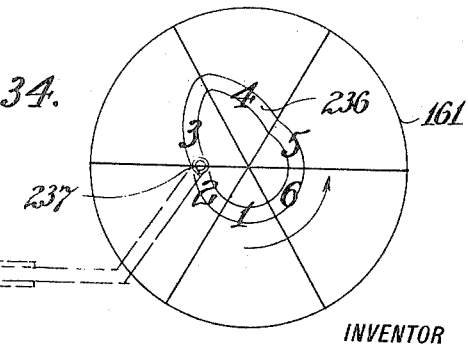
Fig. 34.

UNITED STATES PATENT OFFICE.

PAUL P. PUPILLA, OF BRADLEY BEACH, NEW JERSEY.

CANDY-COATING MACHINE.

1,294,946.   Specification of Letters Patent.   Patented Feb. 18, 1919.

Application filed February 7, 1914, Serial No. 817,175. Renewed April 4, 1918. Serial No. 226,781.

*To all whom it may concern:*

Be it known that I, PAUL P. PUPILLA, a citizen of the United States, and a resident of Bradley Beach, in the county of Monmouth and State of New Jersey, have invented a new and Improved Candy-Coating Machine, of which the following is a full, clear, and exact description.

This invention relates to candy making machines, and more particularly to a machine for coating candy centers with chocolate or other coating material.

The general objects of the invention are to provide a coating machine which is of large capacity and efficient and reliable in operation, and in its practical embodiment the machine comprises means for simultaneously feeding into a separating chamber a tray containing molding material and candy centers, and a grid or holder for receiving such centers, means for bringing the grid and tray together, means for turning the tray and grid over to empty out the molding material and deposit the centers on the grid, means for separating the inverted tray and grid, means for feeding the filled grid forwardly to a transfer grid, means for operating the transfer grid to remove the centers from the traveling grid and delivering the centers to a coating grid, means in the form of a movable tank for applying coating material to the centers of the coating grid, means receiving coating material from the tank and delivering jets of coating material to the tops of the coated centers to finish the same, a removing grid which moves into and out of the coating grid to remove the coated centers therefrom, conveying belts for receiving the centers from the removing grid, a sheet conveying mechanism arranged to enable the belts to deliver the centers on sheets of paper or the like, and means for refilling the empty trays with molding material, whereby the trays can be taken to a molding machine and have cream deposited therein to form centers.

For a more detailed understanding of the invention reference is to be had to the accompanying drawings taken in connection with the following description and appended claims.

In the accompanying drawings which illustrate one embodiment of the invention and wherein similar characters of reference indicate corresponding parts in all the views, Figure 1 is a side view of a machine with the delivery end broken away.

Fig. 1ª is a diagrammatic view of four successive positions of the parts that operate the tray-engaging dogs;

Fig. 1ᵇ is an enlarged detail view of part of the operating means for the tray-engaging dogs;

Fig. 2 is a vertical longitudinal section of the machine;

Fig. 2ª is a detail perspective view of part of the tray carrier;

Fig. 2ᵇ is a fragmentary perspective view of the scraping comb.

Fig. 3 is a section showing a continuation of the left end of the view in Fig. 2;

Fig. 4 is an enlarged detail section of the dusting brush which dusts the centers while passing from the separating chamber to the coating mechanism;

Fig. 5 is a transverse vertical section of the machine on the line 5—5, Fig. 1, showing the tray hopper or rack with the means for controlling the feed of the trays therefrom, and also showing means for reversing the empty trays that are ejected from the separating chamber;

Figure 6:
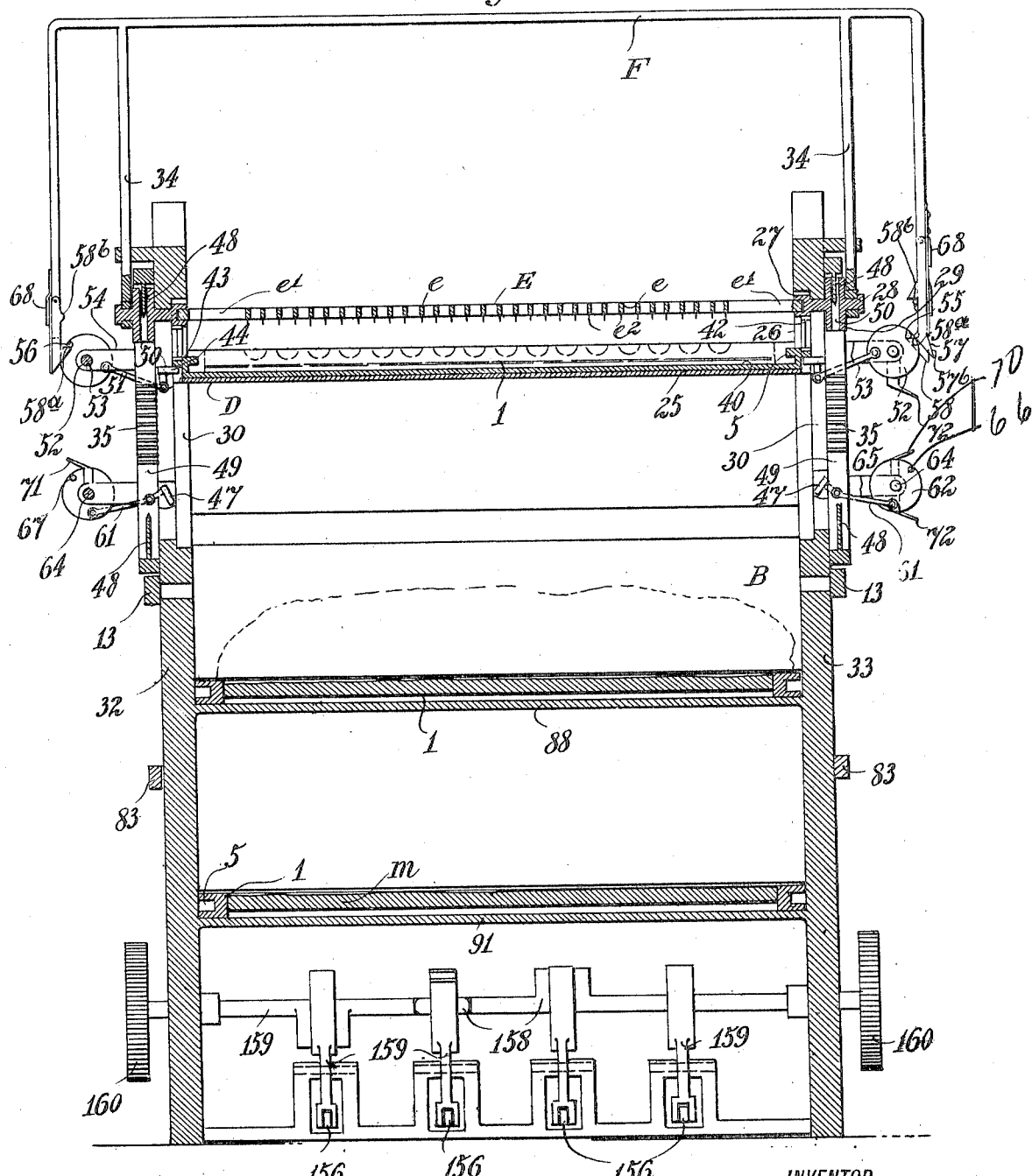
Figure 14:
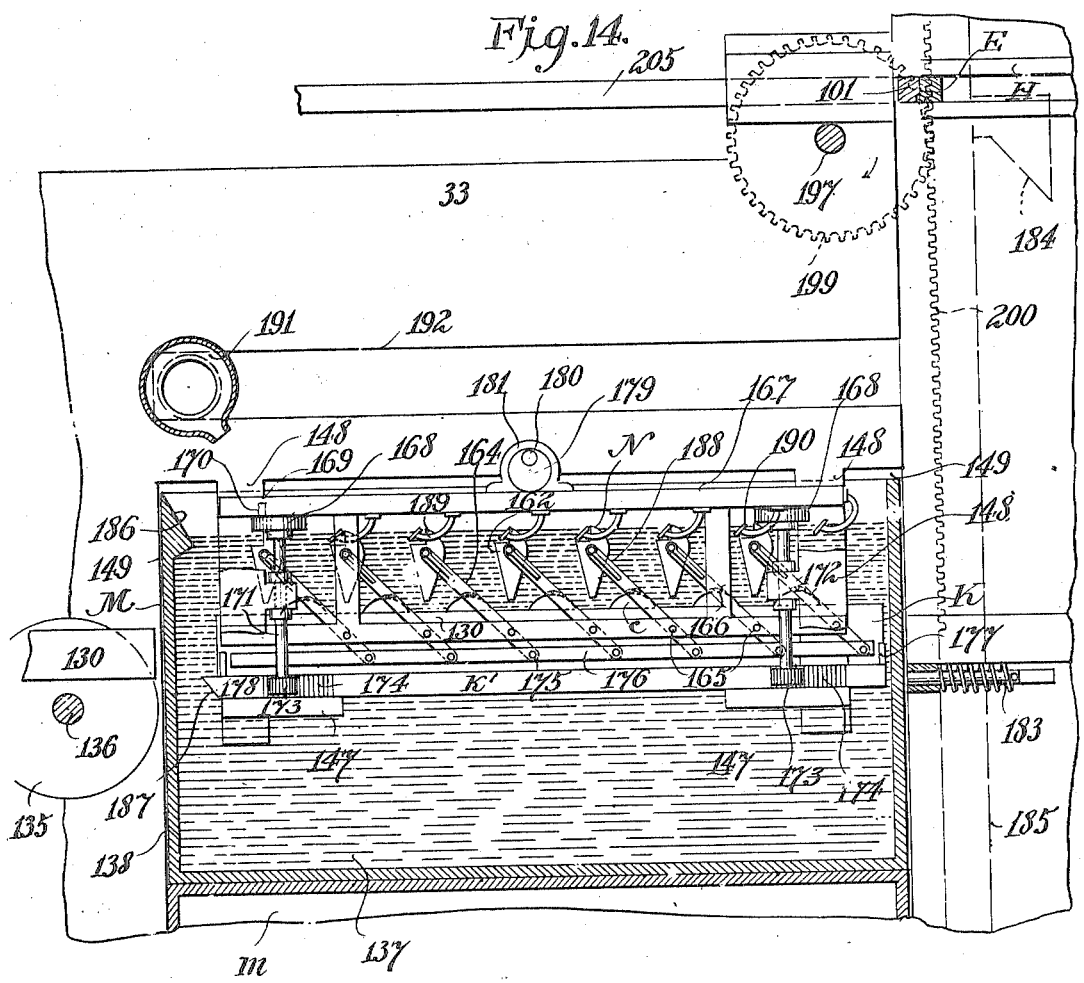
Figure 15:
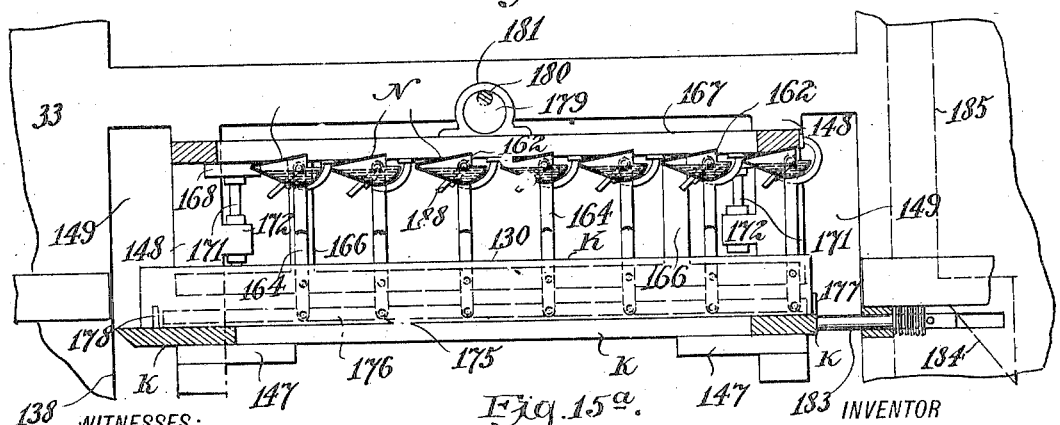
Figure 15A:
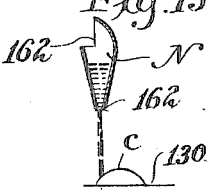

Fig. 6 is a transverse vertical section on the line 6—6, Fig. 1, taken through the separating chamber and showing the means for bringing a receiving grid and tray together, reversing the two for emptying the molding material or starch from the tray and depositing the centers on the grid, and finally separating the inverted grid and tray, and also showing the tracks on which the re-filled trays travel and showing the pumps for circulating the chocolate in the coating mechanism;

Fig. 7 is an enlarged detail view showing the upper left hand portion of Fig. 6, with the receiving grid and tray brought together preparatory to their inversion;

Fig. 7ª is a detail sectional view on the line 7ª—7ª, Fig. 7;

Fig. 8 is a sectional view similar to Fig. 7, showing the tray and grid inverted and the grid separated from the tray and the two ready to be moved out of the separating chamber;

Fig. 8ª is a sectional view on the line 8ª—8ª, Fig. 7;

Fig. 9 is a perspective view of one of the catches or stopping devices used in connection with mechanism for controlling the bringing together or separation of the tray and grid in the separating chamber;

Fig. 10 is a diagrammatic view, in perspective, of the complete system of catches or stops at each side of the separating chamber;

Fig. 10$^a$ is a perspective view, partly broken away, of the carrier in the separating chamber which is adapted to receive a tray and grid and cause the same to be inverted for separating the molding material from the centers;

Fig. 11 is a vertical transverse section on the line 11—11, Fig. 1, and taken through the coating mechanism;

Fig. 11$^a$ is a detail sectional view of one of the means for agitating the coating grid;

Fig. 12 is a fragmentary perspective view of one of the jet devices for depositing jets of finishing coating material to the centers;

Fig. 13 is a sectional view on the line 13—13, Fig. 12;

Fig. 14 is a sectional view through the coating mechanism on the line 14—14 Fig. 11, showing the centers submerged in the tank of coating material and the jet devices in the act of filling with a coating material;

Fig. 15 is a section on the line 15—15, Fig. 11, showing the jet devices in non-discharged position;

Fig. 15$^a$ is a detail view showing a jet device depositing a finishing coating material on a candy center;

Fig. 16 is a sectional view on the line 16—16, Fig. 1, showing one of the driving cam wheels for the various operating mechanisms of the machine, the dusting brush for dusting the candy centers, and the track arrangement for the re-filled trays;

Fig. 17 is a detail sectional view showing the operating means for the transfer grid or removing grid associated with the coating mechanism;

Fig. 18 is a perspective view of a sheet conveying mechanism at the delivery end of the machine for successively bringing the sheets to the conveying belts which deliver the coated centers to the sheets;

Fig. 19 is a perspective view of one of the fork members for spreading the belts of the sheet conveying mechanism for enabling the sheets with the centers thereon to be removed;

Fig. 20 is a perspective view of one of the sheets or carriers on which the finished centers are deposited for the removal from the machine and convenient handling;

Fig. 21 is a transverse section on the line 21—21 Fig. 3 of the sheet conveying mechanism;

Fig. 21$^a$ is a detail sectional view of part of the sheet conveying mechanism;

Fig. 22 is a detail sectional view through one of the driving belts of the sheet conveying mechanism, showing the manner in which the sheets are engaged therewith;

Fig. 23 is a fragmentary plan view showing a center-receiving or conveying grid with the centers thereon about to be removed by the transfer grid;

Fig. 23$^a$ is a perspective view of the air blast device used in connection with the coating mechanism for blowing off superfluous coating material immediately after the same has been applied to the centers;

Fig. 24 is a similar view showing the transfer grid delivering the centers to the coating grid;

Fig. 25 is a similar view showing the coated centers about to be removed from the coating grid and the transfer grid returned to its initial position and the receiving or conveying grid carried away;

Fig. 26 is a similar view showing the coated centers in the act of being deposited on the conveying belts;

Figs. 27 and 27$^a$ are sectional views on the line 27—27, Fig. 23, respectively showing the uncoated candy centers before and after being taken up by the transfer grid;

Figs. 28 and 28$^a$ are sectional views on the line 28—28, Fig. 24, respectively showing centers before and after being placed on the coating grid;

Figs. 29 and 29$^a$ are sectional views on the line 29—29, Fig. 25, respectively showing the coated centers before and after being picked up by the removing grid;

Figs. 30 and 30$^a$ are sectional views on the line 30—30, Fig. 26, respectively showing the coated centers before and after being delivered to the conveying belts;

Figs. 31 to 34 are diagrammatic views of the cam motions for operating the various mechanisms of the machine; and Fig. 35 is a perspective view of the conveying, transfer, coating and removing grids.

The present invention is primarily a candy center coating machine and is adapted to receive trays containing molding material and candy centers cast therein from a molding and casting machine, and hence the present machine includes means whereby the trays are so handled that the candy centers are separated from the molding material or starch and fed after being separated to the coating mechanism, the molding material itself being used to re-fill the trays as they are emptied, so that such trays can be carried back to the molding and casting machine for further use. At the receiving end of the machine is a tray hopper or rack A in which are piled a plurality of trays 1 which contain molding material $m$ and candy centers $c$. The rack A is open at the top so as to receive the trays, and it is provided at its bottom with feeding or ejecting means that successively feeds the trays from the bottom of the rack to a separating chamber B arranged to one side of and below the level of the bottom of the rack. Movable back and forth in the bottom of the rack is the feeder or ejector 2, Fig. 2, which, when at its right extreme position, allows a tray to pass in front of it, so as to be ejected when the feeder 2 moves to the left, the tray passing out through an opening 3 into the chamber B. Means may be provided for supporting the pile of trays off the lowermost tray as the latter is being ejected. In the present instance, as shown in Fig. 5, a pair of dogs 4 move simultaneously inwardly from opposite sides of the machine and are adapted to enter openings or grooves 5 in the sides of the tray 1 second from the bottom, so as to hold such second tray and those superimposed thereto while the bottom tray rests on ledges 6, Fig. 5, in position to be moved outwardly by the feeder 2, Fig. 2. The dogs 4 are slidable in guides 7 and have rack teeth 8 with which mesh pinions 9 on the upper ends of vertical shafts 10 suitably mounted on vertical slides 11. These slides are movable in guides 12, Fig. 1, carried by the machine frame. The function of the slides, together with the dogs, is to bodily lower the pile so that the lowermost tray can be released in position for ejectment and then the dogs are adapted to engage the second tray and lift the same with the superimposed trays upwardly. For this purpose a cam plate 13 is arranged under each slide 11 to move horizontally on tracks 14 on the front and rear sides of the machine frame, as shown in Fig. 5. The cam plates 13 have two cam surfaces 15 and 16 with a horizontal portion 17 between the cam surfaces, and a horizontal portion 18 forming a continuation of the bottom portion of the cam surface 16. In other words, the cam plates are step-shaped, and by means of this formation the slides 11 and dogs 4 have an up and down movement. The dogs are adapted to be engaged with the secondmost tray, as in Fig. 5, throughout the downward movement of the slides 11, and then the dogs are released and move upwardly with the slides until the dogs are opposite the second tray. At this point the dogs are thrown inwardly to engage the second tray, so that as the slides and dogs continue their upward movement the pile will be lifted off the lowermost tray. This inward and outward movement of the dogs is effected by means of a spring-pressed finger 19 carried by and pivotally mounted on the lower end of each shaft 10. This finger moves behind oppositely-disposed abutments 20 and 21 carried by each cam plate 13. By reference to Figs. 1 and 1ª it will be understood that as the cam plate 13 moves, the finger 19 will slide off one abutment, enter between the abutments and engage the other abutment which, as the cam plate continues to move, will cause the shaft 10 to rock, which has the effect of throwing in or throwing out the tray-gripping dogs 4. The first step in the series of movements of the dog-actuating means, beginning with Fig. 1, is the movement of the cam plates 13 to the left. The finger 19 slides off the abutment 20 and enters between it and the abutment 21, and simultaneously with this the slides 11 and dogs 4 move downwardly on the cam surfaces 15, 17 and 16, and by the time the slides reach the bottom of the cam surfaces 16, the fingers 19 of the shafts 10 will strike the inner ends of the abutments 21, whereby the shafts will be rocked as the cam plates 13 move to the left. This causes the dogs 4 to be retracted when the tray is resting on the ledges 6, Fig. 5. The cam plates 13, Figs. 1 and 1ª, then move to the right, and in so doing the slides 11 are elevated by the cam surfaces 16, and while the horizontal surfaces 17 are under the slides the dogs 4 are thrown into engagement with the second tray from the bottom. This movement of the dogs is effected by the fingers 19 sliding off the abutments 21 and entering between them and the abutments 20 as the cam plates 13 move to the right, and finally the abutments 20, acting through the fingers 19, rock the shafts 10 so that the dogs are thrown into tray-engaging position. As the cam plates continue to move to the right the surfaces 15 elevate the slides, dogs and pile of trays so that the lowermost or released tray can be moved out of the hopper or rack by the feeder 2. This feeder 2 is connected with vertical frames C movable horizontally and embodying rack bars 22 which mesh with suitably driven pinions 23, so timed in their action with respect to the cam plates 13 that the pile of trays will be held raised while the feeder 2 is operated.

The separating chamber B contains a vertically movable and invertible carrier D, Figs. 2 and 10ª. This carrier consists of a plate 25 having upright corner members 26 at each end, which support grooved bars or rails 27 parallel with the bottom plate 25. Extending outwardly from each rail is a journal 28 provided with a mutilated pinion 29. The journals 28 move in vertical slots 30 in the side walls of the separating chamber B. When the carrier is in raised position the bottom plate 25 thereof is approximately on a level with the lowermost tray in the rack A, so that when such tray is ejected it will be received by the carrier. The grooved rails 27 will at the same time be in the path of a horizontal track 31 formed by flanges on the inner surfaces of the front and rear frames 32 and 33 on the machine structure.

Candy center receiving or conveying grids E are fed step by step so that one grid will enter the carrier in a position above the tray therein. The carrier is suspended by means of members 34 of vertically movable traveling frames F on the front and rear frames of the machine structure. Rack bars 35 are arranged adjacent the grooves 30 so as to mesh with the mutilated pinions 29 of the slots, whereby the carrier is turned through one hundred and eighty degrees in order to bring the grid therein under the tray for the purpose of depositing the candy centers on the grid while the molding material drops through the latter. Before this inversion of the carrier can occur and before the filled grid and empty tray can be taken out it is necessary to bring the grid and tray together before they are turned, and then separate the tray and grid after they are turned. This is accomplished by the mechanism shown in Figs. 6 to 10 inclusive.

In the carrier D is a tray-holding plate 40 which has recesses 41 at its corners, as shown in Figs. 7ᵃ and 10ᵃ, to receive ribs 42 on the members 26 of the carrier, and the ends of this plate 40 have approximately T-shaped flanges 43. These flanges 43 are adapted to engage in the grooves 5 in the ends of the trays 1, so that the tray in the carrier and plate 40 will move together within the limits of the bottom plate 25 and the grid E in the carrier.

Beginning with the parts shown in Fig. 6, the grid E moves downwardly toward the tray 1 therein, as the carrier as a whole moves, but the tray 1 is held stationary momentarily by means of catches or dogs 44, Figs. 6, 7, 8 and 10, which dogs are mounted to engage under the flanges 43 of the tray-carrying plate 40. As soon as the grid E meets the top of the tray the two are held together by spring studs 45 (Fig. 8ᵃ) on the bars 27 of the carrier D engaging in sockets 46 in the flanges 43 of the plate 25. The dogs 44 are now released automatically and the grid and tray begin to turn by reason of the mutilated pinions 29 meshing with the rack teeth 35. By the time the end of the racks 35 are reached a grid and tray will have turned through one hundred and eighty degrees, with the grid lowermost and the tray above. Slipping of the tray and grid in the turning of the carrier D is prevented by the springs 27ᵃ and 43ᵃ, Fig. 10ᵃ, that respectively engage the grid E and tray 1. A set of lower catches or dogs 47 are thrown into the path of the flanges 43 on the tray-carrying plate 40 and arrest the movement of the tray just as the carrier completes its turning. The carrier, however, continues to move downwardly until it assumes the position shown in Fig. 8, where the candy centers c are shown resting on the grid E and the tray 1 empty. The filled grid and empty tray can now be removed from the separating chamber, so that the carrier can move upwardly to its receiving position, and in so doing be restored by turning through one hundred and eighty degrees. When in receiving and discharging position the carrier D is held absolutely horizontal by means of vertical fixed pins 48 at the upper and lower ends of members 49 which carry the racks 35, such pins 48 being disposed adjacent the upper and lower ends of the guide slots 30. The mutilated pinions 29 have diametrical openings 50 so arranged as to receive the pins 48, said openings 50 in the pinions being at right-angles to the plane of the bottom plate 25 and rails 27 of the carrier. Any suitable means may be employed to operate the dogs or catches 44 and 47 in timed relation to the movement of the carrier. For instance, the upper dogs 44 are connected by links 51 with crank wheels 52, which wheels are fastened to a shaft 53 journaled in bearings 54 on the machine structure. On one wheel is a pin 55 and on the other is a pin 56, and with these pins coöperate respectively pawls 57 and 58 carried by the lower ends of members 59 and 60 on the vertical traveling frame F, which latter is suitably guided on the machine frame structure. The pawl 57 has an abutment 57ᵃ which in moving downwardly strikes the pin 55 and swings the dogs 54 from the position shown in Fig. 7 to that shown in Fig. 8. The pawl 58 has a shoulder 58ᵃ which engages the pin 56 so that on the upward movement of the pawl the upper dogs 44 are swung upwardly from the position shown in Fig. 8 to that shown in Fig. 7. The lower dogs 47 are connected by links 61 with crank wheels 62 and 63 on the ends of a shaft 64 journaled in bearings 65 on the frame structure of the machine, and these wheels have pins 66 and 67 respectively, so arranged that the shoulders 57ᵃ and 58ᵃ engage them on the down and up movements of the reciprocatory frame F, whereby the lower dogs are thrown from the position shown in Fig. 7 to that shown in Fig. 8, and vice versa. The pawls 57 and 58 are pressed by springs 68, so that they can yield laterally. The lower end of the dog 57 has a beveled extremity 57ᵇ which is adapted to strike an abutment 70 when the lower dogs 47 have reached the position shown in Fig. 8. Such abutment 70 serves to throw the dog 57 laterally out of engagement with the pin 66. On the pawl 58 is a projection 58ᵇ which strikes an abutment 71 as the pawl moves upwardly, and by means of this abutment and projection the dog is swung outwardly to disengage the shoulder 58ᵃ thereof from the pin 67. An abutment 72 is arranged in the path of the beveled end 57ᵇ of the pawl 57, so as to release such pawl from the pin 55 on the wheel 52 for the upper set of dogs 44, so that the said pawl can continue its movement downwardly to operate the lower set of dogs. It is, however, understood that the carriage D moves up and down during the idle period of the feeder or ejector 2, and furthermore the carrier is idle while the said feeder or ejector is in operation.

When the carrier D is in lowered position, as shown in Fig. 8, the empty tray 1 is removed by a horizontally movable ejector 75, Fig. 2, which moves to the right and shifts the empty tray out of the separating chamber B through an opening 76, and a feeder or ejector 77, Fig. 2, moves from the right side of the chamber B to the left, and thereby ejects the center-containing grid E from the carrier D to a track 78 disposed under the grid-supporting track 31. The filled grids move to the left on the track 78 to the coating mechanism hereinafter to be described.

Under the tray holder A is an empty tray reversing carrier G, Figs. 2 and 5, which is in the form of a horizontal frame having central journals 79 rotatable in the upper ends of slides 80 which are movable in guides 81 in the front and rear frames of the machine. The lower ends of these guides 80 are connected with the ends 82 of levers 83 fulcrumed at 84 on the front and rear frames 32 and 33 of the machine, one of such levers being shown in Fig. 1. In the slots 81 are racks 85 with which the mutilated pinions 86 of the journals 79 are adapted to mesh, whereby the carrier G is turned through one hundred and eighty degrees. This carrier has flanges 87 which are adapted to extend into the grooves 5 in the ends of the trays 1, so that the holder G and tray will move together. When the ends 82 of the levers 83 move upwardly the carrier G is elevated to a position in alinement with the opening 76. The empty tray is at this time ejected from the mixing chamber B and passes under the carrier G. As the carrier moves downwardly by the operation of the levers 83 the carrier and empty tray are turned through one hundred and eighty degrees and finally the carrier will come to rest with the empty tray, as shown in Fig. 2, in the plane of a track 88 and a feeder 89, in front of which the empty tray is conducted by the carrier G. This feeder 89 is adapted to move to the left, Fig. 2, and feed the empty trays successively along the track 88. This track 88 passes under the bottom of the separating chamber B, which is bottomless, and consequently as the trays pass thereunder they receive the starch or molding material that has been dumped out by previous trays during the process of separating the centers from the starch. A sieve 90 suitably agitated serves to sift the starch before it falls into the empty trays. This forward movement of the empty and refilled trays is synchronous with the feeding of the trays from the holder A to the carrier D in the separating chamber B, and consequently the feeder 89 forms a part of the horizontal reciprocatory frame or structure C, Figs. 1 and 2. Under the track 88 is another track 91 along which the refilled trays travel to a point where they are taken off by an attendant and carried to a molding and casting machine. A carrier 92 is movable from the track 88 to the track 91, and in line with the track 91 is a horizontal reciprocatory feeder 93 which feeds the refilled trays to the right along the track 91. A receptacle 94 is disposed under the carrier 92 so as to collect any loose starch which may be carried along with the traveling refilled trays.

The grids, holders or equivalent devices E for receiving the candy centers from the trays comprise rectangular structures consisting of parallel bars $e$ suitably spaced apart, and the bars at one end are all connected together within a rectangular frame $e'$, the opposite ends of the bars $e$ being free so as to constitute a plurality of parallel finger-like members, and the side of the frame $e'$ adjacent the free end of the fingers is open. The fingers or bars $e$ have pins or other suitable means $e^2$ which are adapted to penetrate the flat sides of the candy centers when the grids are brought into contact with the filled trays in the carrier within the separating chamber. In other words, the grids E may be considered as forks, this construction being preferable for facilitating the easy removal of the centers from the forks so as to be placed in the coating mechanism in the exact relative positions the centers occupied in the molding trays. The filled grids E as they feed toward the coating mechanism have the free ends of their bars or fingers presented toward such coating mechanism, and the centers rest on the tops of the grids, as clearly shown in Fig. 2. When, however, the empty grids travel to the separating chamber they are in inverted position with the pins $e^2$ extending downwardly, so that they will take hold of the candy centers when the trays and grids are brought together in the carrier D. At the right end of the track 78 is a carrier H which moves vertically and is adapted to turn through one hundred and eighty degrees in its travel. As shown in Fig. 1, this carrier is supported on members 95 of the vertically movable frame F, and connected with the journals 96 of the carrier H are mutilated pinions 97 which are adapted to mesh with racks 98 so disposed that at an intermediate point in the travel of the carrier it will turn through one hundred and eighty degrees. It will be understood that the carrier H, and in fact the carrier for the empty trays, will be provided with means for preventing the grid or tray from slipping out of the respective carriers when the latter are turning. For this purpose the grooved side members $h$ of the carrier each has a spring or equivalent gripping means 99, Fig. $2^a$, in the groove 100. The side members $h$ of this carrier are connected together by a cross bar or equivalent means $h'$, so that a rectangular structure open at one side is provided. When the carrier is in its lowered position the foremost tray E is fed into the same by means of the feeder 77, and after the candy centers $c$ are removed from the grid E within the carrier H by means of the transfer grid I, the carrier H is moved upwardly by the frame F, and finally the carrier H reaches a position in alinement with the track 31. An ejector or feeder 101, Fig. 2, now ejects the empty grid E from the carrier H by moving such grid to the right, whereby the grids of the track 31 are moved so that an empty grid will enter the carrier D in the separating chamber B, while the recently emptied grid E is being ejected from the carrier H. It will be understood that the carrier H while in receiving and discharging position will be maintained horizontal by pins 102, which enter the pinion 97 when such pinion is in its extreme upper or lower position.

Before the centers are delivered to the coating mechanism they are subjected to a brushing action for removing loose starch. Consequently, a brush J is mounted over the track 78 and disposed in a horizontal position, so that the entire upper surface of each candy center will be brushed not only by the trays passing under the brush, but by the brush working back and forth over the candy centers. The actuating means for the brush comprises a shaft 103, Figs. 2, 4 and 16, mounted in a bearing 104, and on the shaft 103 is a crank pin 105 connected with the brush J, and consequently the rotation of the shaft will reciprocate the brush both longitudinally and laterally. It is to be understood that at least two shafts are connected with the brush preferably at the forward corners or those corners nearest the coating mechanism, but in the figures mentioned the actuating means at one corner of the brush is shown. On each shaft 103 is a pinion 106 which meshes with rack teeth 107 movable horizontally. These rack teeth are arranged on bars 108 to which the ends of the empty tray feeder or ejector 75 are connected, and said bars 108 are each united by a vertical connection 109, Fig. 1, with a horizontal bar 110. The bars 110 are outside the frame structure of the machine, while the bars 108 extend into the frame structure through openings 111. The bars 110 which are reciprocated horizontally by mechanism hereafter to be described have rack teeth 112. Meshing with the rack teeth on these bars are pinions 113, which in turn mesh with rack teeth 114 on the cam plate 13, so that such cam plate receives motion from the bars 110 which control the empty tray ejector 75 and the brush J. This brush J is connected with the sieve 90 by connecting means 115, Figs. 2 and 16, whereby the said sieve 90 will be agitated by the movement of the brush.

The transfer grid I may be considered as part of the coating mechanism, in that it serves to supply the candy centers thereto. This grid is in the nature of a fork consisting of bars 116 horizontally disposed and connected together by a transversely-extending member 117, the free ends of the bars 116 being adjacent the coating mechanism. This transfer grid I is slidable horizontally on the table 118 into and out of the coating grid K. The table 118 has a slight vertical movement for the purpose of moving the grid I upwardly in the receiving or conveying grid E that has been moved to a position over the transfer grid, and also for the purpose of lowering the transfer grid while in the coating grid, so that the candy centers will be placed on and supported by the latter. In Figs. 23 and 27 the bars 116 of the transfer grid are shown immediately prior to the upward movement of the table 118, and in Fig. $27^a$ the transfer grid is shown raised with the candy centers $c$ lifted off the bars of the grid E. This vertical movement of the table 118 is produced by cams 119 mounted on a rock shaft 120 extending transversely of the machine, and such cams are adapted to engage depending members 121 on the table. As shown in Fig. 17, the shaft 120 is adapted to have a slight longitudinal movement against the tension of a spring 122, such longitudinal movement being produced by a radial finger 123 rigid on the shaft 120 and a stationary cam 124. As the shaft 120 rotates, the finger 125 travels on the cam 124, and consequently the shaft is moved to the left, Fig. 17, until the elevating cams 119 pass from under the members 121 of the table, and when this occurs the table drops and is retained in this position until the shaft is rocked in the opposite direction far enough to bring the surfaces $119^a$, Fig. 2, in such a position that the cams 119 can slide under the members 121 by the spring 122 moving the shaft 120 to the right, Fig. 17. This downward movement or drop of the table does not occur, however, until the transfer grid I has moved completely into the coating grid K. In other words, after the table 118 has been raised to cause the grid I to take up the candy centers from the conveying grid E that has been fed thereto, the table is maintained in this position while the grid I moves to the left, Fig. 2, and when it reaches the end of this movement the table drops as aforesaid, and consequently the candy centers are delivered to the coating grid. The transfer grid then slides backward on the table 118, which it is understood has only a vertical movement and does not move back and forth horizontally with the grid I. The horizontal movement of the grid I is produced by levers 125 on the ends of the shaft 120, the said levers having bifurcated ends 126 into which engage the ends of a horizontal rod 127 extending transversely of the machine and movable in horizontal slots 128 in the side frames of the machine. This rod enters a recess 129 in the bottom of the bar 117 of the transfer grid. By reason of the slot 129 the grid I can have a vertical movement with the table 118 and yet there will always be a connection between a grid and the means for operating the same horizontally. The coating grid K comprises a plurality of horizontally disposed spaced bars 130 which, as shown in Figs. 23 to 26, inclusive, are so related to the transfer grid that such bars 130 non-aline with the bars 116 of the transfer grid. By reason of this relation the transfer grid can slide horizontally into the coating grid from the position shown in Fig. 23 to that shown in Fig. 24, and consequently the candy centers c are transferred from the conveying grid E to the coating grid K, and during the movement of the transfer grid into the coating grid the upper edges of the bars 116 of the transfer grid will be supported a small fraction of an inch above the corresponding edges of the bars 130 of the coating grid, so that the candy centers will not engage the said bars and become displaced while the transfer grid enters the coating grid. After the transfer grid is entered, as shown in Figs. 24 and 28, the transfer grid moves downwardly so as to deposit the candy centers on the top edges of the bars of the coating grid, as shown in Fig. 28$^a$. After the centers have been placed on the coating grid the transfer grid moves back to its receiving position and the candy centers are then coated. A removing grid L mounted at the side of the coating grid opposite from the transfer grid is employed to remove the coated centers. This transfer grid consists of a plurality of parallel bars 131 connected with a cross-bar 132, and these parallel bars 131 are so positioned as to enter between the bars 130 of the coating grid so that the coated centers can be removed from the latter in the same manner that the transfer grid removed the uncoated centers from the conveying grids. In Figs. 25 and 29 the centers are represented as having been coated, and the removing grid L is in position to engage the coated centers and remove them to a position for delivery from the machine. In Fig. 29$^a$ the removing grid has moved upwardly to lift the coated candies from the coating grid, and in Figs. 26 and 30 the removing grid is shown as having traveled from receiving to discharge position to one side of or completely out of the coating grid. The removing grid is moved back and forth and raised and lowered by a mechanism similar to that which performs the same functions in connection with the transfer grid I, and the corresponding parts will be recognized by the numbers being primed. It will be noted that the various grids are so related and operated that the centers will maintain the exact relation they occupied to each other in the molding trays, that is to say, they will be maintained in rows and spaced apart throughout their transit through the machine the distance they occupied in the molding trays. After the removing grid reaches the position shown in Fig. 26 it deposits the coated centers on a plurality of endless belts 133 which have their upper stretches horizontally disposed and so arranged between the bars of the removing grid that the downward movement of the latter from the position shown in Fig. 30 to that shown in Fig. 30$^a$ will deposit the coated centers on the belts, which convey them to a sheet-conveying mechanism hereinafter to be described, whereby the centers are placed upon sheets or other means convenient for handling. These belts pass over suitable guide rollers 134 and driving pulleys 138, the said driving pulleys being mounted on a shaft 136 which may be continuously driven in any suitable manner.

The coating mechanism embodies a tank M which is disposed under the coating grid K and moves upwardly so that the said grid and centers thereon will become submerged in the heated chocolate or other coating material 137. The ends of the tank M extend through openings 138 in the side frames 32 and 33 of the machine, and by fitting in these openings the tank is guided in its up and down movements. The ends of the tank have fastened thereto vertically disposed rack bars 139 movable in guides 140, and meshing with the rack bars 139, Fig. 1, are pinions 141 which have their shafts 142 connected with pinions 143 that mesh with rack teeth 144 on horizontally movable bars 145, which bars are slidable in guides 146 carried by the frame structure. The coating grid K is supported on transverse horizontal members 147 connected with depending members 148, which members are spaced apart from the side edges of the openings 138 in the frames 32 and 33 of the machine, so as to provide slots 149, Figs. 1, 2, 14 and 15, so as to permit the walls of the tank M to pass upwardly far enough that the coating grid will be submerged in the chocolate. The coating grid comprises a rectangular frame consisting of side members $k$ and end members $k'$ and centers supporting parallel bars 130 that are rigid on the side bars $k$. The size of the grid K will of course be smaller than the horizontal dimensions of the tank, so that the grid can enter the tank to enable the centers of the grid to be submerged. The chocolate in the tank M is kept at a constant level, and for this purpose a circulating system is employed. This system comprises a supply tank or reservoir M' located under the tank M, and one or more pumps 150 receive chocolate from the reservoir M' and deliver it through pipes 151 to the tank M, the upper ends 152 of the pipes being formed into spouts which are located above the upper limit of the movement of the tank M. By means of these pipes a constant supply of chocolate is maintained in excess of the amount required for coating the candy centers and consequently the surplus overflows through pipes 153 to the lower tank or reservoir M', said pipes 153 having their upper ends 154 connected with the tank M at points where a constant level is to be maintained, and the lower ends 155 terminate in spouts which are arranged to discharge into the lower tank. The pistons of the pumps 150 are connected by rods 156, Figs. 2 and 6, with rockers 157 operated by cranks 158 on the shaft 159, which shaft has gear wheels 160 that mesh with large gear wheels 161, which also form driving means for the various instrumentalities that go to make up the machine.

In order to impart a decorative finish to the coated centers, means are employed to direct streams of chocolate on the tops of the centers after they are removed from the coating tank, the streams and the coated chocolates being relatively moved, whereby the finishing coating material will be distributed or deposited regularly or irregularly, according to the shape desired for the finished candy. This depositing of the finishing coating material is accomplished by a plurality of jet devices N which are supported over the coating grid and constructed and mounted as shown in Figs. 2, and 11 to 15 inclusive. Each device N consists of a trough-like hollow body having an opening 162 and provided in its bottom with small apertures 163 which deliver jets of chocolate when the jet devices N are in discharging position. One device is used for each transverse row of candy centers on the coating grid, and there will be as many jet devices as there are transverse rows. Each device N is mounted at its ends on levers 164, which levers are fulcrumed at 165 on the sides 166 of a frame 167 which is mounted over the coating grid. This frame is supported on crank wheels 168 arranged at the corners of the frame, and each wheel has a crank pin 169 which engages in a socket 170 in the frame 167, so that as the crank wheels rotate the frame will be moved back and forth in a horizontal plane, whereby the streams of chocolate delivered by the jet devices will be deposited on the coated candy centers more or less in a circular figure. The crank wheels 168 are fastened to the upper ends of the vertical shafts 171 which extend through bearings 172 on the members 148, and the lower ends of the shafts are provided with pinions 173 which mesh with rack teeth 174 on the side members $k'$ of the base frame of the coating grid K, so that the back and forth movement of the grid will rotate the shafts 151 and cause the frame 167 to move as explained. The levers 164 have their lower ends connected at 175 with a link 176, the ends of which are adapted to engage abutments 177 and 178 which are carried by the coating grid so that as the latter moves back and forth it will oscillate the levers which carry the jet discharging devices N. The frame 167 which carries the jet discharging devices is adapted to be agitated in any suitable manner, as, for instance, by rapidly rotating eccentrics 179 fastened to a shaft 180 and rotating in eccentric straps 181 fastened to the ends of the frame 167. This shaft 180 can be driven by a flexible shaft 182, Fig. 11, connected with any suitable motor means. By agitating the frame 167 in this manner the streams of chocolate will be deposited more or less irregularly on the coated candy centers. The means for moving the coated grid in one direction consists of a spring-returned plunger 183 adjacent each end, Figs. 14 and 15, each of which is adapted to be engaged by a cam 184 carried by a vertically movable rod 185, Fig. 1. The rods 185 move downwardly and bring the cams 184 into engagement with the plungers 183 after the tank has been lowered from the position shown in Fig. 14, and the plungers are moved longitudinally into engagement with the coating grid so as to move the latter to the left from the position shown in Fig. 14 to that shown in Fig. 15. As the tank moves upwardly a beveled surface 186 thereon engages the beveled surface 187 on the coating grid, so that the latter is moved to the right, it being understood that before this action takes place the cam 184 moves upwardly, so that the plungers 183 will recede out of the path of the upwardly-traveling tank M. The jet discharging devices N are so positioned that they will automatically fill by being submerged in the chocolate in the tank, as shown in Fig. 14. As soon as the tank lowers below the plungers the latter are forced inwardly to move the coating grid K to the left, Fig. 14, and in so doing the candies are brought under the jet discharging devices N, which are so pivoted that they hang normally with their orifices downward. At the same time as the candy centers are moved to the left with the grid, the devices N are swung to the right, and by this relative movement jets of chocolate are discharged on the candy centers, the form taken up by this deposited chocolate being determined by the motion which is imparted to the frame that carries the jet discharging devices, and by the motion of the grid itself. During the last part of the swinging movement of the devices N, arms 188 rigidly connected with the journals 189 of the devices N strike abutments 190 carried by the frame 167, and by this means the jet discharging devices N are swung from the discharge position shown in Fig. 15ª to the non-discharge position shown in Fig. 15. The position shown in Fig. 15 will be maintained until the tank again moves upwardly to refill the jet discharging devices and coat the next batch of candy centers that are conveyed to the coating mechanism, and the return of the devices to pendant position is effected by the return movement of the coating grid, due to the beveled surface 186 of the tank striking the beveled edge 187 of the grid. After the candy centers have been coated with chocolate or finished they are subjected to a blast of air to remove superfluous chocolate, such blast being produced by a moving nozzle 191 supported above the coating mechanism and movable in horizontal slots 192 in the frame structure. This blast-producing device or nozzle 191 is connected by a flexible hose 193, Fig. 23ª, with a blower or other source of air 194. The nozzle 191 is caused to move horizontally by a cord 195 winding on a drum 196 which is mounted on a shaft 197, and coöperating with this cord 195 is a spring 198 which serves to return the blast device 191 when the cord unwinds from the shaft 197. Pinions 199 mesh with rack teeth 200 on the vertical cam-carrying bars 185, so that as the bars 185 reciprocate the shaft 197 is turned, it being understood that the rods 185 are connected at 201 with the coating tank, so that they move up and down therewith. On the shaft 197 are pinions 202 which mesh with rack teeth 203 on horizontal bars 204, so that the up and down movement of the tank causes a horizontal reciprocation of these bars. On the left ends of these bars are horizontal members 205 to which is connected the feeder or ejector 101, Fig. 2, which ejects the empty grids E from the carrier H. The right ends of the bars 204, Fig. 1, have rack teeth 206 which mesh with the pinions 23, and consequently these bars 204 reciprocate the frames C which control the feeding of the filled and empty trays respectively into the carrier D and into the bottom of the chamber B, Fig. 2.

As the candy centers are being coated it is necessary that they maintain their proper position on the coating grid, otherwise difficulties would be encountered in removing the coated candy centers. For this purpose retaining devices in the form of light rods 207, Figs. 12, 13 and 15, are fastened to the levers 164, so as to engage the tops of the candy centers and hold them down on the grids as the candy centers are being submerged. These devices move out of engagement with the coated candy centers as the levers 164 swing upwardly to bring the jet discharging devices into action, and consequently the retaining devices 207 will not interfere with the discharge of the finishing coating material on the centers. The tanks are provided with suitable heating means, such as a pan $m$ for the tank M, and a heating coil $m'$ for the reservoir M. As the grid is submerged, as well as the candy centers thereon, the bars of the conveying grid may become smeared with chocolate, and in order to scrape the chocolate from the bars 116 of the conveying grid, a scraping comb 208 extends across the machine and is fastened to the frames 32 and 33, and teeth 209, as shown in Fig. 2ᵇ, are arranged in pairs to engage respectively opposite sides of each bar 116 of the transfer grid I.

After the candies are coated and have been conveyed away from the coating mechanism by the removing grid A and conveying belts 133, they are deposited upon sheets, plates or the like, which serve as supports or carriers whereby the finished candies can be conveniently handled. These sheets or carriers O may be made in any suitable manner and have their upper surfaces paraffined or otherwise prepared so that the candies will not stick thereto; and the mechanism P for conveying these sheets or plates to and from receiving position is clearly shown in Figs. 3, and 18 to 22 inclusive. The sheet conveying mechanism comprises a pair of belts $p$ and $p'$ arranged at each edge of a table T, Fig. 21, which table is arranged in the same plane with the upper portions of the conveying belts 133, so as to support a plate O while the candies are being fed thereto by the said belts 133. The sheet conveying belts $p$ and $p'$ are endless, and one is nested within the other, and each pair passes around a driving pulley 210, so that the belts travel together and at the same rate. The lower stretches of the belts $p'$ are looped upwardly by being passed around guide rollers 211, so that the lower stretches of the belts $p$ can receive the plates O, as shown in Figs. 3 and 22, the plates being piled one on top of another and held by fixed guide members 212. These plates or sheets O have lugs 213 on their lower faces which are adapted to enter openings 214 in the belt $p$, whereby the belt will engage with the lowermost plates and carry the same to the position to receive the coated candies.

These plates are flexible so that they can pass with the belts around guide means 215 in moving from a position under the table T to a position over the same. During this movement of the sheets O with the belts, the edges of the sheets are clamped between the belts $p$ and $p'$. As the foremost edge of a sheet begins to pass over the table it meets the candies that are being delivered by the conveying belts 133, and as the sheet feeds along the table the belts will continue to deposit candies thereon. After the sheet has been completely filled it is ready for removal, and for this purpose the upper stretch of the belt $p$ is raised from the lower stretch of the belt $p'$, and consequently the lugs 213 of the filled sheet will disengage from the belts $p$, and as the belts are separated the filled sheet can be removed from the mechanism in a direction transversely to the belts and between the latter, where they are separated. This separation of the belts is produced by a fork Q for each pair of belts, the upper ends of the forks having prongs or horizontally extending members $q'$ which engage under the upper flight of belts $p$ and cause them to be raised, as shown in Fig. 18, from the position shown in Fig. 3. In order to permit the belts to be separated in this manner a slack take-up device must be provided, such device being shown in the form of a pair of stationary spaced pulleys 216 and a pair of spaced movable pulleys 217 carried by the prong or member $q^2$ of the lifters Q. When the lifters Q move downwardly the pulleys 217 lie in the same horizontal plane and side by side with respect to the pulleys 216, so that the belt $p$ will be crinkled by means of such pulleys, and thereby shortened or tensioned to contact with the belt $p'$. The lifters Q have rack teeth 218 which mesh with sectors 219, such sectors being pivoted on the frame structure of the machine and connected with the horizontal bars 145, Figs. 1, 2 and 3, which latter are moved intermittently so as to cause the belts to be separated for the removal of a filled sheet or plate.

The driving mechanism for the machine comprises the large gear wheels 161 which may be rotated in any suitable manner, as, for instance, by the gears 160, which in turn may be rotated by a gear wheel 220 driven by a belt and pulley means 221. The wheels 161 are provided with a cam groove 222 which serves to vertically reciprocate the frame F, such frame having members 223 provided at their lower ends with studs 224, Fig. 16, which enter the grooves 222, and connected with these members 224 is the lever 83, whereby the latter is oscillated. It will thus be seen that the cam groove 222, the shape of which is clearly shown in Fig. 32, serves to impart vertical reciprocatory movement to the tray and grid carrier D, the grid carrier H, the empty tray carrier G, and filled tray carrier 92, which is connected to members $92^a$ of the frame or frames F. The wheels 161 are also provided with cam grooves 226, shaped as shown in Fig. 31, in which extend rollers or equivalent means 227 on horizontally extending bars or elements 228, which elements terminate in forks 229 for receiving pins 230 on the conveying grid operating levers 225. Also on the wheels 161 are cam grooves 231 into which extend rollers 232, Fig. 33, on the horizontal bars 234, which oscillate the levers 125', Fig. 1, of the removing grid actuating means. Connected with the wheels 161 are cams 235 having cam grooves 236 into which extend rollers 237 on the bars 145, so as to reciprocate the same, the shape of the cam grooves 236 being clearly shown in Fig. 34.

To understand the timed relation of the various mechanisms, reference is to be had to the diagrams of the cams shown in Figs. 31 to 34. Each cam is divided into sixths, numbered 1 to 6. Assuming that the cams are rotating anticlockwise, it will be seen that the cam groove 236, Fig. 34, is the only one which is operating, all the other cam grooves being inactive. The cam groove 236 causes the bars 145 to move to the left, and consequently the coating tank is raised, and also the sheet conveying mechanism opened, so that a filled sheet of candy can be removed. The upward movement of the tank causes the horizontal feeders or ejectors to operate, since the vertical rack bars 185 reciprocate the rack bars 204, that in turn reciprocate the frame C, and as a result a tray containing starch and candy centers will be fed into the separating means, and also an empty grid will be fed into such means; and furthermore, an empty tray will be fed into a position to receive starch from the separating chamber B. This movement takes place as the cam wheels rotate through sixty degrees, and while the sector number 3, Fig. 34, is acting on the rod 145, and all the said parts move on their return strokes as the part of the cam 236 in sector number 4 is acting on the bars 145. During the remaining two-thirds of the revolution the rods 145 are inactive, since the portion of the cam grooves 236 in sectors numbers 1, 2, 5 and 6 are concentric with the axis of rotation. As soon as the rods 145 reach the end of their stroke to the left the cam grooves 222 become active, as shown in Fig. 32, by the part of each in sector number 5 operating on the frame F and lever 83, whereby the frame F is lowered and the free ends of the levers 83 raised, whereby the carriers D, H and 92 are moved downwardly, and the carrier G raised. The carriers remain in this position during one-half of a revolution of the cam grooves 222, and then the said frame and levers are moved in the opposite direction during the next one-sixth of a revolution, and the said parts are again stationary during the following one-sixth of a revolution. After this point is reached the cycle of operation is repeated. The transfer grid I, which is operated by the cam grooves 226, is operated by the portions of said grooves lying in the sectors 1 and 2, Fig. 31, and this movement of the grid occurs during the interval when the frame F is down and while the coating tank M is down. The part of the cam lying in sector number 2, Fig. 31, moves the grid to the left or to discharge position, while the part lying in sector number 1 returns the grid to receiving position. The removing grid which is operated by the cam grooves 231, is moved to the right or receive position by that part of each cam groove lying in sector number 5, Fig. 33, and is moved to the left or discharge position by the part of the cam lying in sector number 6; and immediately after this moving of the removing grid out of the coating grid to discharge position, the transfer grid begins to move into the coating grid to deposit centers on the coating grid. When the rods 234 move to the left to rock the levers 125' and move the removing grid to receiving positions, the said levers reciprocate the bars 110 to the right. These bars 110 move the cam plates 13 to the left for controlling the trays 1 in the rack A, and moving the feeder 77 to the left for feeding the grids E. The bars 110 also move the feeder or ejector 93 through pinions 250, Fig. 1, meshing with rack teeth 251 on the bar 110, said pinions being mounted on vertical shafts 252 which have at their lower ends pinions 253 that mesh with rack teeth 254 on horizontal bars 255, to which the feeder 93 is connected. Thus the cam grooves 231 control the movements of the removing grids, the feeders 77 and 93 and the cam plates 13 for the tray controlling dogs 4.

If desired, a blower 256, Fig. 2, may be used in connection with the brush in order to remove the loose particles of starch from the candy centers before they are coated.

Having thus described my invention, I claim as new and desire to secure by Letters Patent:

1. A candy coating machine comprising a grid, a tank containing coating material and into which the grid is submerged for coating candy centers resting on the grid, and a grid movable in a rectangular course in a vertical plane for removing coated candy centers from the grid.

2. A candy coating machine comprising a grid, a tank containing coating material and into which the grid is submerged for coating candy centers resting on the grid, a grid movable in a rectangular course in a vertical plane for removing coated candy centers from the grid, said last mentioned grid being movable from one side of the tank to a position over the latter and back again, and a candy center supply grid movable from a point at the opposite side of the tank to a position over the latter and back again for supplying candy centers to the first mentioned grid.

3. A candy coating machine comprising a coating grid consisting of a plurality of parallel bars on which are placed the centers to be coated, a grid movable into the coating grid to place thereon the centers, means for moving the latter grid horizontally into and out of the coating grid, a tank in which the centers are immersed, and a removing grid movable into the coating grid and out of the same for removing the coated centers.

4. A candy coating machine comprising a coating grid for receiving the centers to be coated, a tank in which the centers are immersed, and a non-swinging device movable into the grid and engageable under the centers thereon to lift such centers off and away from the grid.

5. A candy coating machine comprising a grid composed of spaced bars for receiving centers to be coated, a tank containing material in which the grid and centers are immersed, a removing grid normally disposed to one side of the coating grid, and means for moving the removing grid horizontally into and out of the coating grid for removing the coated centers therefrom.

6. A candy coating machine comprising a grid composed of spaced bars for receiving centers to be coated, a tank containing material in which the grid and centers are immersed, a removing grid normally disposed to one side of the coating grid, means for moving the removing grid horizontally into and out of the coating grid for removing the coated centers therefrom, and endless belts arranged to receive the coated centers from the removing grid.

7. A candy coating machine comprising a coating grid to receive the centers to be coated, a supplying grid movable horizontally into and out of the coating grid from one side and having a slight downward movement within the coating grid for delivering the centers to the coating grid, a tank in which the centers are immersed for receiving the coating material, and a removing grid movable into and out of the coating grid at the side opposite from the supplying grid and having a slight upward movement in the coating grid to take the centers off the coating grid.

8. A candy coating machine comprising a coating grid to receive the centers to be coated, a supplying grid movable horizontally into and out of the coating grid from one side and having a slight downward movement within the coating grid for delivering the centers to the coating grid, a tank in which the centers are immersed for receiving the coating material, a removing grid movable into and out of the coating grid at the side opposite from the supplying grid and having a slight upward movement in the coating grid to take the centers off the coating grid, and conveying belts arranged adjacent the removing grid, said conveying belts and removing grid being relatively movable for simultaneously delivering to the belts all the centers on the removing grid.

9. A candy coating machine comprising a coating grid, a supplying grid movable horizontally into the coating grid while its top surface is in a higher plane than the top surface of the latter, and movable downwardly while in the coating grid to deliver candy centers thereto, and a tank containing coating material reciprocating vertically to coat the said centers.

10. A candy coating machine comprising a coating grid, means for bringing to a point at one side of the grid rows of candy centers to be coated, a transfer grid movable upwardly into the said means for removing the centers therefrom and movable laterally into the coating grid and thence downwardly to deposit the centers on the latter and returnable automatically to initial position, and means for applying coating material to the centers while on the coating grid.

11. A candy coating machine comprising a coating grid, a grid containing rows of centers, means for feeding the said grid to a point adjacent the coating grid, a transfer grid for removing the centers and delivering them to the coating grid without disturbing the relative positions of the centers, a coating tank in which the centers are immersed, a removing grid for removing the coated centers from the coating grid while maintaining the centers in their original relative positions, and conveying means on which the removing grid deposits the coated centers.

12. A candy coating machine comprising a track, candy center receiving grids movable along the track intermittently, a coating grid, a transfer grid for simultaneously removing the centers successively from each receiving grid and depositing them in the same original relative position to the coating grid, a removing grid movable into and out of the coating grid for removing the coated candies in their original relative positions, and conveying means for receiving the coated centers from the removing grid.

13. A candy coating machine comprising a coating grid composed of spaced bars, a grid movable to one side of the coating grid for conveying the centers to be coated and consisting of bars spaced apart like the bars of the coating grid, a transfer grid having bars arranged to enter between the bars of the conveying and coating grids, means for moving the transfer grid upwardly in the conveying grid and horizontally therefrom into the coating grid and thence downwardly to deposit the centers on the bars of the latter, and means for applying coating material to the centers while on the coating grid.

14. A candy coating machine comprising a coating grid composed of spaced bars, a grid movable to one side of the coating grid for conveying the centers to be coated and consisting of bars spaced apart like the bars of the coating grid, a transfer grid having bars arranged to enter between the bars of the conveying and coating grids, means for reciprocating the transfer grid from the conveying to the coating grid, and vice versa, means for raising the transfer grid into the conveying grid to remove the centers therefrom and to lower the transfer grid in the coating grid to deposit the centers thereon, and means for applying coating material to the centers.

15. A candy coating machine comprising a coating grid composed of spaced bars, a candy center conveying grid movable to the coating grid and consisting of spaced bars alining with the bars of the coating grid, a transfer grid having bars intermediate the bars of the said grids, means for moving the transfer grid back and forth between the conveying and coating grids, means for lifting the transfer grid in the conveying grid to remove the candy centers therefrom and lowering the transfer grid in the coating grid to deposit the centers thereon, means for applying coating material to the centers while on the coating grid and after the transfer grid has moved therefrom, a removing grid having spaced bars disposed to enter between the bars of the coating grid, means for moving the removing grid to and from the coating grid, means for moving the removing grid upwardly in the coating grid to remove the coated centers therefrom and to lower the removing grid after the latter has moved out of the coating grid, and means for receiving the coated centers from the removing grid when the latter goes through its lowering movement.

16. A candy coating machine comprising a coating grid consisting of bars spaced apart in such relation that each center to be coated will rest on at least two bars, a grid having bars arranged to enter between the bars on the coating grid, a table for the second grid, means for imparting an up and down movement to the table, means for moving the second grid into the first-mentioned grid while the table is raised to supply candy centers to the coating grid and for moving the second grid out of the coating grid after the table is lowered, and means for applying coating material to the centers while on the coating grid.

17. A candy coating machine including a coating grid composed of spaced bars, a grid for supplying thereto the centers to be coated and consisting of bars arranged to enter between the bars of the coating grid, means for moving the second grid horizontally into and out of the coating grid, a vertically movable support for the second grid, and means for moving the support upwardly preparatory to the entrance of the second grid into the coating grid and for moving the supporting grid downwardly preparatory to the second grid leaving the coating grid.

18. A candy coating machine including a coating grid composed of spaced bars, a grid for supplying thereto the centers to be coated and consisting of bars arranged to enter between the bars of the coating grid, means for moving the second grid horizontally into and out of the coating grid, a vertically movable support for the second grid, means for moving the support upwardly preparatory to the entrance of the second grid into the coating grid and for moving the supporting grid downwardly preparatory to the second grid leaving the coating grid, and means for conveying to the second grid candy centers arranged in rows.

19. A candy coating machine comprising a coating grid, a track, conveying grids movable along the track for conveying rows of centers to be coated, a transfer grid for transferring the centers successively from the conveying grids to the coating grid, a carriage for moving the empty conveying grids from the transfer grid, and a second track along which the empty conveying grids are moved for refilling.

20. A candy coating machine comprising a coating grid, a track, conveying grids movable along the track for conveying rows of centers to be coated, a transfer grid for transferring the centers successively from the conveying grids to the coating grid, a carriage for moving the empty conveying grids from the transfer grid, a second track along which the empty conveying grids are moved, and mechanism for supplying centers to the empty conveying grids and conveying such filled grids to the first-mentioned track.

21. A candy coating machine comprising a coating grid, a grid for conveying thereto the centers to be coated, a transfer grid disposed under the path of movement of the conveying grids, means for moving the transfer grid to remove the centers from the conveying grids and delivering them to the coating grids, means for removing the empty conveying grids from the transfer grid and reversing the conveying grids during such removal, means for moving the empty conveying grids to refilling position, means for feeding to the empty conveying grids trays containing centers, and means for reversing each empty conveying grid and its associated tray for transferring the centers from the latter to the conveying grid.

22. A candy coating machine comprising a coating mechanism in which centers arranged in rows are coated, a grid movable horizontally into and out of the mechanism in different planes for removing the coated centers while maintaining them in rows, conveying means for receiving the rows of centers from the removing grid, and a sheet-carrying mechanism arranged to receive the centers from said conveying means.

23. A candy coating machine comprising a coating mechanism in which rows of centers are simultaneously coated, endless conveying belts at one side of the coating mechanism, removing means movable horizontally from the conveying belts into the coating mechanism and from the latter back to the conveying belts for transferring the coated centers in rows to the belts, and traveling sheet conveying means arranged to receive the centers from the belts.

24. A candy coating machine comprising a coating mechanism including sets of bars, each set being adapted to receive a row of centers to be coated, sets of conveying belts alining with the sets of bars, and means movable upwardly between the bars to remove the coated centers therefrom and movable between and longitudinally of the belts with the centers held above the plane of the latter, and finally movable downwardly to deposit the centers on the belts.

25. A candy coating machine comprising a coating grid for supporting rows of centers to be coated, a removing grid for removing the centers in rows, endless conveyers for receiving from the removing grid the rows of centers, means for moving the removing grid from the conveyers to the coating grid and back again, a table on which the removing grid slides, means for raising the table after the removing grid has entered the coating grid, whereby the coated centers are lifted off the coating grid, and for lowering the removing grid after the same has moved out of the coating grid to deposit the coated centers on the conveyers.

26. A candy coating machine comprising a grid consisting of bars spaced apart less than the diameters of the candy centers to be supported and a second grid consisting of bars spaced apart less than the diameters of the said centers and arranged to enter between the bars of the first-mentioned grid, means for moving the grids horizontally into and out of each other, and means for producing relative up and down movement of the grids for removing the centers from the first grid by the second grid taking up the centers.

27. A candy coating machine comprising a grid consisting of spaced bars for supporting candy centers, a removing grid movable horizontally in the first-mentioned grid, a table on which the movable grid slides, a lever for moving the movable grid back and forth horizontally, and a device for raising the movable grid preparatory to movement in one direction and lowering it preparatory to movement in the opposite direction.

28. A candy coating machine comprising a conveying grid consisting of parallel bars having center-holding pins, and a grid movable upwardly in the conveying grid for lifting the centers off the pins thereof and thereafter movable laterally from the conveying grid.

29. A candy coating machine including a tray containing candy centers and molding material, a grid adapted to be placed on the tray and be inverted therewith for receiving the centers while the molding material is permitted to drop out of the tray, means by which the tray and grid are brought together, and means for separating the tray and grid.

30. A candy coating machine including a tray for containing molding material and candy centers, a grid consisting of bars adapted to overlie the centers in the tray and provided with devices for engaging the centers, means for bringing the tray and grid together for attaching the centers to the grid, and means for reversing the grid and tray for emptying out the molding material from the tray and depositing the centers on the upper side of the grid.

31. A candy coating machine including a tray for containing molding material and candy centers, a grid consisting of bars adapted to overlie the centers in the tray and provided with devices for engaging the centers, means for bringing the tray and grid together for attaching the centers to the grid, means for reversing the grid and tray for emptying out the molding material from the tray and depositing the centers on the upper side of the grid, means for effecting the separation of the tray and grid, a coating mechanism, and means for feeding the grid to the coating mechanism.

32. A candy coating machine including a vertically movable and invertible carrier, means for feeding to the carrier a tray containing molding material and centers, means for feeding to the carrier a device for receiving the centers when the carrier is in one position, means for moving the carrier and causing the same to invert, whereby the molding material drops out of the tray, and the centers are deposited on the device, and means for removing the empty tray and the filled device from the carrier when the latter is in its other position.

33. A candy coating machine including a carrier, a tray placeable in the carrier and containing molding material and candy centers, a grid placeable in the carrier in a position over the tray and having depending center-engaging means, means for moving the carrier, means for bringing the tray and grid together during the first part of the movement of the carrier, means for reversing the carrier, during the intermediate part of its movement for emptying the molding material from the tray, and means for separating the inverted tray and grid at the latter part of the movement of the carrier.

34. A candy coating machine including a carrier, means for moving the carrier, means for reversing the carrier during the intermediate part of its movement, devices for separately feeding in spaced relation to the carrier a tray containing molding material and candy centers and a grid for receiving the said centers, means for bringing the grid into engagement with the centers during the first part of the movement of the carrier, means for separating the tray and grid during the last part of the movement of the carrier, and separate means for removing the empty tray and the center-containing grid from the carrier when the latter reaches the end of its movement.

35. A candy coating machine including a carrier, means for moving the carrier, a rack and pinion, means for reversing the carrier at an intermediate stage of its movement, separate devices for moving into the carrier when the latter is stationary, a tray containing molding material and candy centers and a grid to receive the centers, means for causing the tray and grid to come together during the first part of the movement of the carrier, whereby the centers become attached to the grid, means for causing the grid and tray to separate during the last part of the movement of the carrier, and devices for moving the empty tray and the filled grid out of the carrier.

36. A candy coating machine including a carrier, means for moving the carrier back and forth, mechanism for causing the carrier to invert in each movement, a tray placeable in the carrier and containing molding material and candy centers, a grid placeable in the carrier in a position over and spaced from the tray, a device for holding the tray stationary during the first part of the movement of the carrier for bringing the centers into engagement with the grid, means for automatically releasing the said device to permit the carrier to continue its movement, and a device for arresting the movement of the tray after the same has been emptied and before the carrier reaches the end of its movement, whereby the tray and grid become separated.

37. A candy coating machine comprising a carrier having guideways, a grid movable into the said guideways, a tray movable into the carrier at a point under and spaced from the grid and containing molding material and candy centers, means for moving the carrier after the tray and grid have been placed therein, catch means for holding the tray stationary during the first part of the movement of the carrier for bringing the centers into engagement with the grid, means for automatically releasing the catch means, means for automatically inverting the carrier to empty the molding material from the tray and support the centers on the grid, catch means for arresting the movement of the empty tray before the carrier reaches the end of its movement, whereby the tray is separated from the grid, and means for removing the empty tray and center-containing grid from the carrier.

38. A candy coating machine including a carrier, a grid movable into the same from one side, a tray containing molding material and candy centers movable into the opposite side of the carrier, means for reversing the carrier to empty the molding material from the tray and deposit the centers on the grid, and means for moving the tray and grid separately from and out of the opposite sides of the carrier.

39. A candy coating machine including spaced tracks, grids movable along the tracks, a carrier movable from one track to the other, trays containing molding material and candy centers, means for feeding the trays successively into the carrier when the latter is in alinement with one track, means for reversing the carrier during its movement to the other track whereby the candy centers are placed on the grid contained in the carrier and the molding material drops out of the tray, means for moving the center-containing grid out of the carrier and track, and means for moving the empty tray out of the carrier.

40. A candy coating machine including upper and lower tracks, a carrier movable from one track to the other and having guide grooves adapted to aline with the tracks respectively when the carrier is in its extreme positions, a grid movable from the upper track into the grooves of the carrier and from the said grooves to the lower track, a tray movable into the carrier at a point under the grid therein and containing the starch and candy centers, means for bringing the grid and tray together for attaching the centers to the grid, means for inverting the carrier at an intermediate stage of its movement, whereby the tray empties its starch and deposits the centers on the grid, and means for separating the grid and tray for permitting the latter to be taken out and the grid to be moved to the lower track.

41. A candy coating machine including a carrier having journals on which it is mounted to rotate through approximately one hundred and eighty degrees, a tray placeable in the carrier and containing molding material and candy centers, a grid placeable in the carrier above and in spaced relation to the tray, means for moving the carrier after receiving the tray and grid, means for preventing the carrier from turning during the first part of its movement, means for causing the tray and grid to come together during such first part of the movement of the carrier, means for turning the carrier during the intermediate part of its movement, means for preventing turning of the carrier during the last part of its movement, and means for causing the tray and grid to separate during the last part of the movement of the carrier for permitting the empty tray and grid to be removed from the carrier.

42. A candy coating machine including a tray containing molding material and candy centers, a grid placeable over the tray, and interlocking means on the tray and grid for preventing relative shifting thereof during inversion for emptying the material out of the tray and depositing the centers on the grid.

43. A candy coating machine comprising a rack for holding a pile of trays containing candy centers and molding material, trays in the rack, a track disposed at one side of the rack and spaced therefrom, a carrier mounted to occupy an initial position between the track and rack, means for feeding a tray from the rack into the carrier, a grid, means for feeding a grid from the track into the carrier above and in spaced relation to the tray, means for causing the tray and grid in the carrier to come together, and means for moving the carrier and causing the same to reverse, whereby the tray empties out its starch through the grid and deposits the centers on the latter.

44. A candy coating machine comprising a dumping or separating chamber, a tray containing centers and molding material, a grid for holding candy centers, means for bringing the tray and grid together within the chamber and inverting them to empty the material from the tray and deposit the centers on the grid, means for feeding the grid with the centers thereon from the chamber, a brush disposed in the path of the centers to dust the molding material therefrom, and a coating mechanism for coating the dusted centers.

45. A candy coating machine comprising a chamber, a carrier therein, a tray movable into the carrier and containing molding material and centers, a grid movable into the carrier, means for inverting the carrier to empty the tray and cause the grid to receive the centers, means for removing the empty tray from the carrier, means for removing the grid from the carrier, and means for feeding empty trays to the bottom of the chamber to receive the molding material therefrom.

46. A candy coating machine including a chamber, a center-receiving grid movable into and out of the chamber, a tray containing molding material and centers and adapted to be emptied through the grid, whereby the latter receives the centers, the bottom of the chamber forming a tray filler, and means for feeding empty trays through the tray filler.

47. A candy coating machine comprising a chamber, a grid, a tray, means therein for bringing together the grid and the tray containing molding material and centers, means for inverting the tray and grid for emptying the molding material and depositing the centers on the grid, means for feeding empty trays through the bottom of the chamber to receive the molding material from the empty trays, and means between the empty tray-feeding means and chamber for removing the empty trays from the chamber and restoring them to bottom-downward position.

48. A candy coating machine comprising a grid for holding the centers to be coated, jet discharging devices movable from a position at one side of the centers to a position over the latter for applying finishing coating material thereto, movable elements on which the devices are pivotally mounted, means for tilting the devices from delivery to non-delivery position during the last part of the movement of the said elements, a tank in which the grid and centers are submerged before the said devices begin to deposit coating material to the centers, and means carried by the elements for engaging the centers and holding them on the grid while the centers are submerged.

49. A candy coating machine comprising means for holding the centers to be coated, a tank for containing the coating material, means for relatively moving the tank and holding means to submerge the centers in the coating material, devices mounted over the holding means and arranged to receive coating material from the tank while the centers are being coated, a mechanism for moving the devices from a position non-alining to a position alining with the centers, an abutment on the tank which serves to actuate the mechanism to move the devices to a position to receive coating material and out of alinement with the centers, and an automatically actuated means movable into engagement with the mechanism after the center-holding means and tank have separated for moving the said devices to discharge position over the coated candy centers.

50. A candy coating machine comprising means for holding the centers to be coated, a tank for containing the coated material, means for relatively moving the tank and holding means to submerge the centers in the coating material, devices mounted over the holding means and arranged to receive coating material from the tank while the centers are being coated, a mechanism for moving the devices from a position non-alining to a position alining with the centers, an abutment on the tank which serves to actuate the mechanism to move the devices to a position to receive coating material and out of alinement with the centers, an automatically actuated means movable into engagement with the mechanism after the center-holding means and tank have separated for moving the said devices to discharge position over the coated candy centers, and means for moving the said devices from discharge to non-discharge position.

51. A candy coating machine comprising means for holding the centers to be coated, a tank in which the holding means with the centers are submerged, a blast device movable over the centers after they are coated and removed from the tank for cooling the coating material, and means for removing the coated centers from the said holding means.

52. A candy coating machine comprising means for holding the centers to be coated, a tank containing coating material and in which the holding means and centers are submerged, devices disposed over the tank for depositing jets of coating material on the centers after the latter are removed from the tank, means movable over the holding means, and devices for delivering a jet of air on the coated centers.

53. A candy coating machine comprising means for feeding trays containing candy centers and molding material, a plurality of grids, separating means into which are placed a grid and tray for separating molding material from the centers, a coating mechanism, guide means in which the grids travel in a circuit to convey the centers to the coating mechanism from the separating means, and means for refilling the trays automatically with molding material from the said separating means.

54. A candy coating machine comprising means for feeding trays containing candy centers and molding material, a plurality of grids, separating means into which are placed a grid and tray for separating molding material from the centers, a coating mechanism, guide means in which the grids travel, said guide means including devices for moving the grids from the separating means to the coating mechanism and back again, means for turning the grids in the said separating means, means to receive the centers from the trays, and means for turning the grids after delivering the centers to the coating mechanism.

55. A candy coating machine comprising means for feeding trays containing candy centers and molding material, a plurality of grids, separating means into which are placed a grid and tray for separating molding material from the centers, a coating mechanism, means in which the grids travel in a circuit to convey the centers to the coating mechanism from the separating means, means for removing the empty trays in inverted position from the said separating means, means for turning the trays after leaving the separating means, and means for feeding the trays through the separating means for receiving molding material therefrom.

56. A candy coating machine including a coating mechanism, a grid consisting of bars on which rest the candy centers to be coated, means for moving the grid into and out of the coating mechanism, and a scraping comb engaging the bars for scraping coating material therefrom in moving out of the coating mechanism.

57. A candy coating machine including a coating grid on which rest the candy centers to be coated, jet-discharging devices for depositing coating material to the coated centers for finishing the tops thereof, and means for imparting movement to the grid during the deposit of finishing coating material thereon for distributing such material on the centers.

58. A candy coating machine including a coating mechanism, means for removing and conveying from the mechanism the coated centers, a sheet feeding mechanism for automatically feeding sheets to the said means to receive the coated centers therefrom, and a table supporting the sheet while receiving the centers, said sheet feeding mechanism consisting of a pair of contacting endless belts for engaging opposite edges of the sheets, means for holding adjacent portions of the belts separated to receive the sheets, interengaging means between one belt of each pair and the sheets for causing the sheets to move with the belts to receiving position, and means for separating the belts to disengage the filled sheets from the belts to permit the sheets to be removed.

In testimony whereof I have signed my name to this specification in the presence of two subscribing witnesses.

PAUL P. PUPILLA.

Witnesses:
  CHATTIN BRADWAY,
  PHILIP D. ROLLHAUS.